US010313205B2

(12) United States Patent
Raman et al.

(10) Patent No.: US 10,313,205 B2
(45) Date of Patent: Jun. 4, 2019

(54) CONTEXT-SENSITIVE COMMAND WHITELISTING FOR CENTRALIZED TROUBLESHOOTING TOOL

(71) Applicant: Nicira, Inc., Palo Alto, CA (US)

(72) Inventors: Chidambareswaran Raman, Sunnyvale, CA (US); Akhila Naveen, Palo Alto, CA (US); Raju Koganty, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 189 days.

(21) Appl. No.: 15/389,158

(22) Filed: Dec. 22, 2016

(65) Prior Publication Data

US 2018/0006877 A1    Jan. 4, 2018

Related U.S. Application Data

(60) Provisional application No. 62/356,218, filed on Jun. 29, 2016.

(51) Int. Cl.
*G06F 11/00* (2006.01)
*H04L 12/24* (2006.01)

(52) U.S. Cl.
CPC ............ *H04L 41/22* (2013.01); *G06F 11/00* (2013.01); *H04L 41/044* (2013.01); *H04L 41/0856* (2013.01)

(58) Field of Classification Search
CPC ....... H04L 12/24; H04L 12/46; H04L 12/803; H04L 12/931; H04L 41/22; H04L 41/044; H04L 41/0856; G06F 11/00
See application file for complete search history.

(56) References Cited

U.S. PATENT DOCUMENTS 7,962,647 B2    6/2011    Suri et al.
9,686,162 B2    6/2017    Singh et al.
9,935,834 B1 *  4/2018    Baveja ................ H04L 41/0846
(Continued)

OTHER PUBLICATIONS

Author Unknown, "Dell Networking CLI for VMware vSphere Distributed Switch," Technical Whitepaper, Dell Networking Product Management, Jun. 2014, 9 pages, Dell Inc.
(Continued)

*Primary Examiner* — Charles C Jiang
*Assistant Examiner* — Kyaw Z Soe
(74) *Attorney, Agent, or Firm* — Adeli LLP

(57) ABSTRACT

Some embodiments provide a method for troubleshooting a virtual network that is implemented across a plurality of computing devices. The method provides a command line interface (CLI) for receiving and executing commands for debugging and monitoring the virtual network. Each command is for communicating with a set of the computing devices in order to monitor a network service being provided by the set of computing devices. The CLI operates in multiple different contexts for monitoring multiple different types of network services. While the CLI is operating in a particular context for a particular type of network service, the method receives a command comprising a set of identifiers. The method determines the validity of the received command under the particular context. When the received command is valid under the particular context, the method transmits data to a computing device identified by the received command.

20 Claims, 15 Drawing Sheets

(56) References Cited

U.S. PATENT DOCUMENTS

| | | | | |
|---|---|---|---|---|
| 2006/0190579 A1* | 8/2006 | Rachniowski | ...... | G06F 9/45512 709/223 |
| 2010/0100950 A1* | 4/2010 | Roberts | .................. | G06F 21/31 726/7 |
| 2016/0344671 A1* | 11/2016 | Hussain | ................ | H04L 51/046 |
| 2018/0006878 A1 | 1/2018 | Raman et al. | | |

OTHER PUBLICATIONS

Author Unknown, "NSX Command Line Interface Reference," NSX for vSphere, 2014, 94 pages, VMware, Inc., Palo Alto, CA.

Author Unknown, "Reference Design: VMware NSX for vSphere (NSX)," Network Virtualization, Design Guide, https:// communities.vmware.com/docs/DOC-27683, Aug. 21, 2014, 167 pages, VMware, Inc., Palo Alto, CA.

Wu, Wenfei, et al., "Virtual Network Diagnosis as a Service," SoCC'13, http://dx.doi.org/10.1145/2523616.2523621, Oct. 1-3, 2013, 15 pages ACM, Santa Clara, CA, USA.

\* cited by examiner

```
manager$ show dfw cluster domainc181

Datacenter: DC1
Cluster: cluster 1

No      Host Name       Host Id         Installation Status
===================================================================
1.      dfwhostA        host34          Ready
2.      dfwhostB        host66          Not Ready
```
⬊ 701

```
manager$ show dfw host host34

Datacenter: DC1
Cluster: cluster 1
Host: dfwhostA

No      VM Name         VM Id           Power
=====================================================
1.      VMA03           vm84            on
2.      VMA04           vm85            off
```
⬊ 702

```
manager$ show dfw vm vm84
Datacenter: DC1
Cluster: cluster 1
Host: dfwhostcoke
VM: VMA03

1.                                          ╱711
Vnic Name: rhel532svrovf-Network adapter 1
Vnic ID : 501f02cc907822ad01864a05d7f18978.000
Filters :
nic311161eth0vmwaresfw.2 ──721
nic311161eth0serviceinstance1.4  ──── 722
nic311161eth0serviceinstance2.5  ╲
                                  723
2.
Vnic Name: rhel532svrovf Network adapter 2    ╱712
Vnic ID : 501f02cc907822ad01864a05d7f18978.001
Filters :
nic311161eth1vmwaresfw.2──724
```
⬊ 703

*Figure 7a*

```
manager$ show dfw host host34 vnic 501f02cc907822ad01864a05d7f18978.000
filter nic311161eth0vmwaresfw.2 rules              \
                                                    711
Rules:                     721
ruleset domainc7 {
$ Filter rules
        rule 1005 at 1 both protocol tcp from addrset ipipset1to addrset dst1005 port 80 accept;
        rule 1004 at 1 inout protocol icmpv6 icmptype 135 from any to any accept;
        rule 1004 at 2 inout protocol icmpv6 icmptype 136 from any to any accept;
        rule 1003 at 3 inout protocol udp from any to any port 68 accept;
        rule 1003 at 4 inout protocol udp from any to any port 67 accept;
        rule 1002 at 5 inout protocol any from any to any accept;
}
ruleset domainc7_L2 {
$ Filter rules
        rule 1001 at 1 inout ethertype any from any to any accept;
}
                                                                    \
                                                                     704
```

```
manager$ show dfw host host34 vnic 501f02cc907822ad01864a05d7f18978.000 filter
nic311161eth0vmwaresfw.2 flows                     \
                                                    711
Flows:                     721
Count retrieved from kernel active(L3,L4)=1,
active(L2)+inactive(L3,L4)=0, drop(L2,L3,L4)=0
531135a500000000 Active TCP 0800 2 1 1 0
10.24.106.75:Unknown(57514) 10.116.90.39:ssh(22) 210 EST 6012 9754 47 44
                                                                    \
                                                                     705
```

```
manager$ show dfw host host34 vnic 501f02cc907822ad01864a05d7f18978.000 filter
nic311161eth0vmwaresfw.2 stats                     \
                                                    711
Stats:                     721
rule 2036: 845 evals, in 0 out 0 pkts, in 0 out 0 bytes
rule 1428: 845 evals, in 0 out 0 pkts, in 0 out 0 bytes
rule 1004: 845 evals, in 18 out 0 pkts, in 1152 out 0 bytes
rule 1004: 672 evals, in 18 out 0 pkts, in 1296 out 0 bytes
rule 1003: 823 evals, in 252 out 0 pkts, in 83420 out 0 bytes
rule 1003: 131 evals, in 0 out 0 pkts, in 0 out 0 bytes
rule 1002: 785 evals, in 4646 out 0 pkts, in 3068616 out 0 bytes
rule 1001: 310 evals, in 253030 out 0 pkts, in 15596640 out 0 bytes
                                                                    \
                                                                     706
```

*Figure 7b*

CONTEXT-SENSITIVE COMMAND WHITELISTING FOR CENTRALIZED TROUBLESHOOTING TOOL

BACKGROUND

While distributed architecture is highly successful in achieving scaling and performance, it introduces significant troubleshooting issues. In a distributed virtual network environment, the network infrastructure comprises different logical resources (LR) and different types of physical endpoints (PE). The typical situation in this distributed virtual network is that a logical resource (such as a logical switch or router) may physically span multiple physical endpoints. While this distributed structure enhances the availability and scalability of the LRs, it often introduces difficulty when one has to troubleshoot or debug the system.

While it is easy to extend and scale a logical network that is distributed over a physical network, it may be difficult to troubleshoot the logical network when fault occurs. Typically, a user has to log into different physical endpoints to troubleshoot the distributed system. This can be difficult for the user for the following reasons: (1) it is difficult for the user to remember different user passwords for different PEs; (2) it is difficult for the user to remember which logical resources are in which PEs; (3) it is difficult for the user to remember which terminal (for CLI) or window (for GUI) is connected to which PE; (4) the command history in different terminals cannot be reused; and (5) IP addresses are mostly meaningless to a human user and hard to memorize or analyze.

SUMMARY

Some embodiments provide a centralized troubleshooting tool (CTT) that enables a user to troubleshoot a distributed virtual network with a single consistent user interface. The distributed virtual network being monitored or debugged by the centralized troubleshooting tool includes different types of distributed logical resources (LRs) and network services that are provided/implemented by physical endpoints (PEs) that are interconnected by an underlying physical network. The single consistent user interface of the centralized troubleshooting tool provides commands that enables uniform presentation of information and statistics regarding the distributed LRs and network services by querying the PEs of the distributed virtual network. This allows the user to compare and analyze the information from different PEs in order to troubleshoot problematic LRs/network services as wells PEs.

The PEs of the network are implementing network services. In some embodiments, some of the network services available in the virtual network environment are provided (e.g., enforced) at the VNICs. In some embodiments, the network services provided at the VNICs include firewall and load balancing. These network services are implemented by individual host machines rather than by dedicated servers. They are therefore referred to as being distributed, i.e., distributed firewall (DFW) and distributed load balancer (DLB). In some embodiments, a PE provides DFW service at a VNIC by enforcing a set of firewall rules to allow or rejects packets through the VNIC (to or from the corresponding VM). In some embodiments, a PE provides DLB service at a VNIC by intercepting packets through the VNIC and distributes the intercepted packets to one of a set of physical destinations in order to balance traffic or computation load.

In some embodiments, the CTT presents the data obtained from communications with the PEs in a same view through a user interface component that utilize either graphical user interface (GUI) and/or command line interface (CLI). The CTT is also in communication with a configuration database at the network manager. Such a configuration manager stores configuration data of various LRs and network services. The CTT in some embodiments fetches data from configuration database to allow comparison between the desired configuration stored at the network manager and the actual configuration implemented at the PEs. Some embodiments present data collected from the PEs by referencing the configuration data retrieved from the configuration database, e.g., by highlighting the discrepancy between the actual configuration collected from the PEs and the desired configuration retrieved from the configuration database, or by associating identifying information retrieved from the configuration database with status collected from the PEs.

As illustrated, each host machine of the host machines 130 is operating virtualization software (also referred to as hypervisors, virtualization monitors, or managed forwarding elements) in order to host a set of VMs. Each VM communicates through VNICs provided by the virtualization software in order to send and receive packet network packet traffic. Each host machine stores a set of configuration data for implementing the various LRs and network services. Some of these configuration data are applied at the VNICs provided by the virtualization software, while other configuration data are applied to other functional components provided by the virtualization software. Each host machine also maintains a set of status and/or statistics regarding the operations of the LRs and of the network services implemented at the host machine. The CTT collects the data from the responses from the different PEs into a uniform presentation regarding the queried LR or network services.

The CTT in some embodiments provides a command line interface (CLI) for debugging and monitoring the virtual network. The CLI receives commands for retrieving network service status associated with VNICs from different PEs. The retrieved network service status is in turn presented by the CLI.

In some embodiments, the retrieved network service status comprises a set of firewall rules that are enforced at a VNIC as part of a distributed firewall (DFW). In some embodiments, the retrieved network service status comprises a set of statistics regarding packets being accepted and rejected by the set of firewall rules. In some embodiments, the retrieved network service status comprises a set of eligible destination addresses for a distributed load balancer that dispatches packet from a VNIC. In some embodiments, the network service status comprises a set of statistics regarding packets being dispatched to a set of addresses that serve as eligible next-hop destinations of a distributed load balancer operating at the VNIC. In some embodiments, the retrieved network service status is of edge services that can be one of network address translation (NAT), border gateway protocol (BGP), and dynamic host configuration protocol (DHCP).

The CTT in some embodiments provides a suite of commands for monitoring and troubleshooting different types of LRs and services. Some embodiments provide commands for different types of LRs and services under different context or modules in CTT, where each context corresponds to one type of LRs or one type of network services. In some embodiments, the different types of LRs and network resources that have corresponding contexts in the CTT include logical router, logical switch, distributed firewall (DFW), distributed load balancer (DLB), and edge services. In some embodiments, some of the CTT contexts provide commands that allow the user to make changes to the configuration data and thereby affects the operations of the LRs and/or the network services.

In some embodiments, a user using the CTT under a particular context would have commands interpreted and checked (whitelisted) under that particular context, i.e., only commands and parameters that are valid or compatible with the particular context would be allowed to reach the PEs through their adaptors. Some embodiments also whitelist the command history cache so that a user using the CTT under a particular context would only see command history that has been whitelisted for that context. In some embodiments, each context recognizes its own set of identifiers, and a command is considered valid or compatible with a particular context only when all of its identifiers are recognized by the particular context. In some embodiments, each context is associated with its own set of accepted syntax elements, and a command is considered valid or compatible with a particular context only all of its syntax elements are in the set of syntax elements that are accepted by the particular context.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 7a-b illustrates several CLI screenshots that show the invocation of some example CTT CLI commands.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a centralized troubleshooting tool (CTT) that enables a user to troubleshoot a distributed virtual network with a single consistent user interface. The distributed virtual network being monitored or debugged by the centralized troubleshooting tool includes different types of distributed logical resources (LRs) and network services that are provided/implemented by physical endpoints (PEs) that are interconnected by an underlying physical network. The single consistent user interface of the centralized troubleshooting tool provides commands that enables uniform presentation of information and statistics regarding the distributed LRs and network services by querying the PEs of the distributed virtual network. This allows the user to compare and analyze the information from different PEs for a same LR or a same service in order to troubleshoot problematic LRs/network services as wells PEs.

The centralized troubleshooting tool in some embodiments provides a centralized troubleshooting service, endpoint adapters, and several different types of user interfaces such as command line interface (CLI) and Graphical User Interface (GUI). The endpoint adapters use a management network for connecting to network PEs such as controllers, edge appliance, and hosts.

Figure 1:
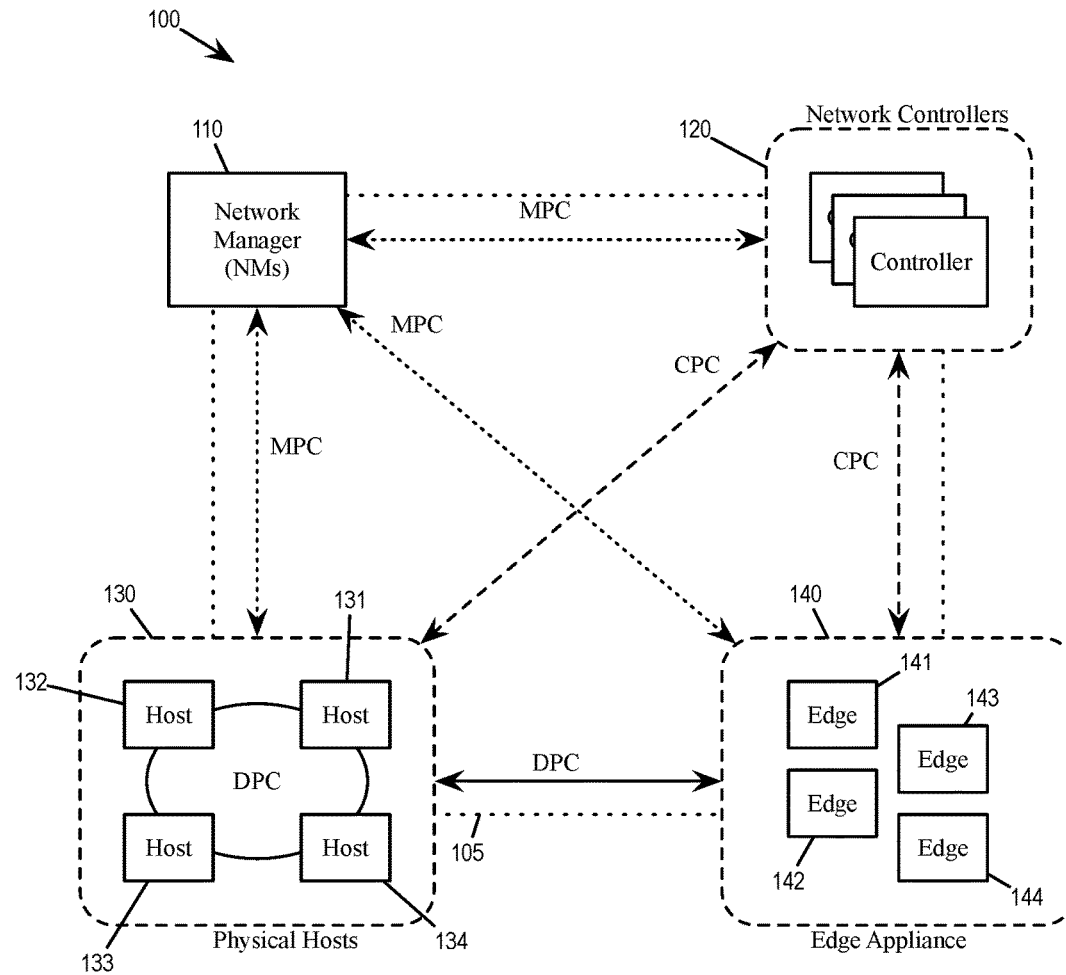
FIG. 1 illustrates a distributed network environment that is built over a physical network having PEs of different types.
Figure 2:
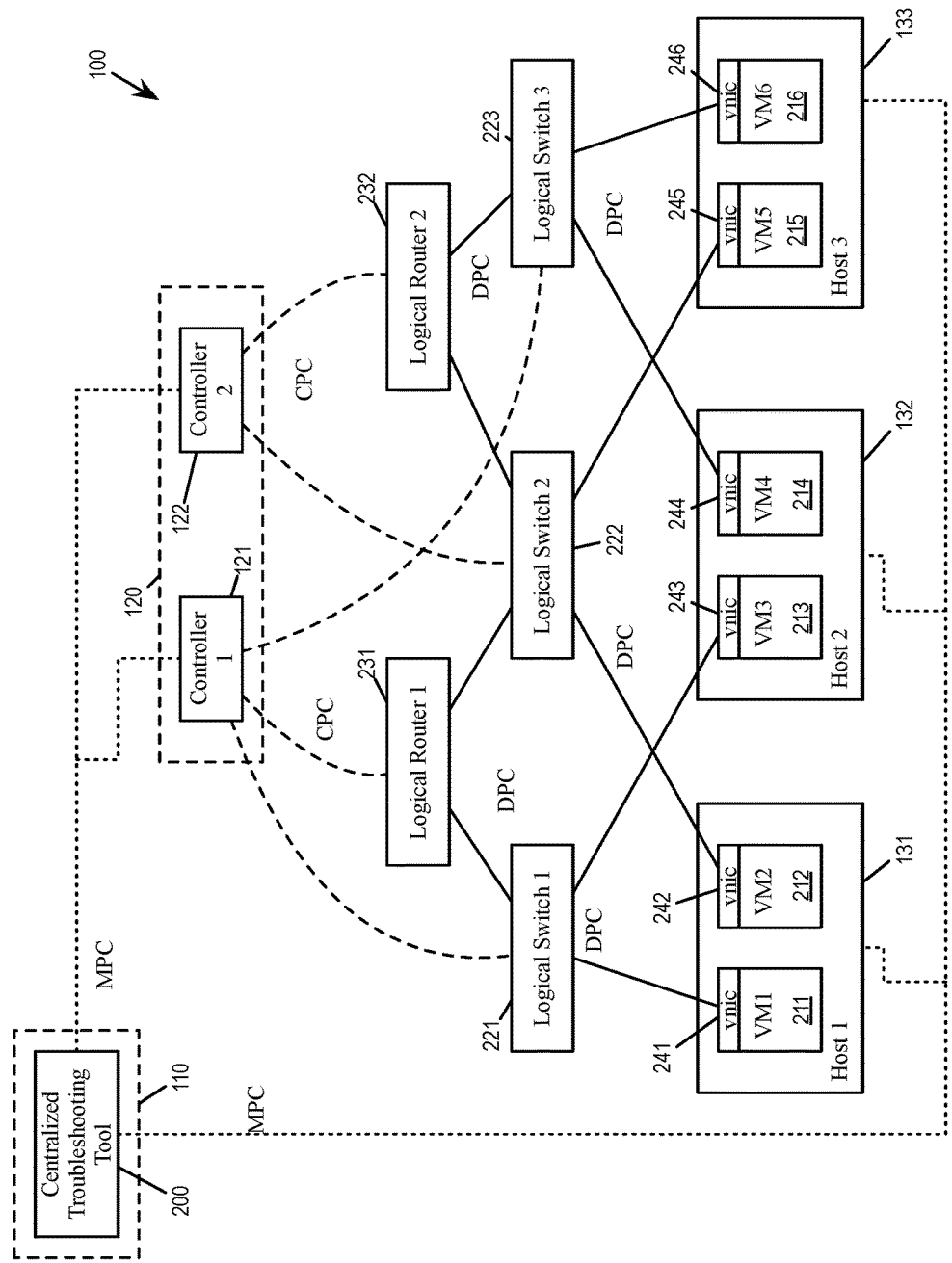
FIG. 2 illustrates a logical view of the distributed virtual network.

For some embodiments, FIGS. 1 and 2 illustrate a distributed virtual network environment 100 that is being debugged/monitored by a centralized troubleshooting tool. The distributed network environment 100 is built over a physical network 105 having physical endpoints (PEs) of different types. As illustrated, the distributed network 100 is implemented over PEs such as a network manager (NM) 110, network controllers (NC) 120, physical hosts (or host machines) 130, and edge appliances 140.

In some embodiments, the distributed virtual network environment 100 is provided by a data center, which provides network and computing resources for one or more tenants. In some embodiments, the distributed network environment 100 provides and operates different logical networks for the data center's various tenants.

Each logical network includes various logical resources (LRs) such as logical switches and logical routers. These logical resources are implemented on physical computing and networking resources, i.e., the physical endpoints (PEs). Specifically, some of the computing resources provided to the tenants are in the forms of virtual machines (VMs) that are operated/hosted by the host machines (e.g., 130), and some of the LRs are implemented by the host machines and the edge appliances (e.g., 140). Each logical network also relies on various network services such as firewall, load balancing, network address translation (NAT), border gateway protocol (BGP), open shortest path first (OSPF) protocol, dynamic host configuration protocol (DHCP), domain name system (DNS), etc. Some of these services are provided at the edge appliances 140. Some of these services are provided at individual host machines (e.g., 130) of VMs in a distributed fashion.

The network manager 110 in some embodiments provide user interface and control of the resources and the services of the distributed network environment 100. Specifically, the network manager 110 performs operations such as monitoring network activities, provisioning/creating VMs, LRs, and network services, among others. In some embodiments, in order to provision the LRs and the network services, the network manager 110 generates configuration data for the network controllers 120, the host machines 130, and the edge appliances 140. The host machines 130 use the received configuration data to implement the provisioned LRs and network services (such as DFW and DLB). The network controllers 120 provides real-time control of the provisioned LRs running in the host machines 130 according to its received configuration data from the network manager 110. In some embodiments, the network controllers 120 is a cluster of controllers where each controller control a subset of LRs (e.g., one logical switch).

To support the communication between the PEs over the physical network 105 when operating the various logical networks, some embodiments setup different channels in the distributed network environment 100, including Management Plane Channel (MPC), Control Plane Channel (CPC), and Data Plane Channel (DPC). DPC is the communication channel used by the distributed network environment 100, which transport the "real" network data of logical networks, e.g., computation data generated for tenant applications. As illustrated, DPC is for transporting data among the host machines 130 as well as to and from the edge appliances 140. CPC is the channel for delivering control signals from the network controllers 120 to control the logical network structures (running in host machines 130 and edge appliance 140) in real time. MPC is the channel for delivering configuration and management data to and from the network manager 110, such as data for provisioning VMs, LRs, network services, as well as data for debugging and monitoring PEs.

FIG. 2 illustrates a logical view of the distributed virtual network environment 100. The logical view shows the logical relationships among the LRs and the VMs that are implemented over (or placed in) the PEs of the physical network.

As illustrated, the distributed virtual network environment 100 is implementing LRs such as logical routers 231 and 232, logical switches 221, 222, and 223. The controllers 121 122 (which are part of the controller cluster 120) controls these LRs. The VMs 211-216 operated by host machines 131-133 use the logical switches 221-223 for L2 packet switching operations and logical routers 231-232 for L3 packet routing operations. In some embodiments, each tenant of the data center owns a subset of the LRs and VMs. For example, in some embodiments, each logical router serves one tenant-specific logical network.

Some of these LRs and network services have their functionalities distributed across different PEs. For example, in some embodiments, each logical router is a virtual distributed router (VDR) that spans (i.e., operates in) multiple host machines (e.g. 131-133), each host machine running a local physical instance (referred to as managed physical routing element or MPRE) of the VDR. Likewise, in some embodiments, each logical switch is a distributed virtual switch (DVS) that spans multiple host machines, each host machine running a local instance (referred to as managed physical switching element or MPSE) of the DVS. MPRE and MPSE will be further described below in Section IV.

The PEs of the network are also implementing network services. As illustrated, each VM operating on a host machine sends and receives packets through a VNIC (virtual network interface controller) provided by the host machine. (VNICs 241-246 respectively for VMs 211-216.) In some embodiments, some of the network services available in the virtual network environment are provided (e.g., enforced) at the VNICs. In some embodiments, the network services provided at the VNICs include firewall and load balancing. These network services are implemented by individual host machines rather than by dedicated servers. They are therefore referred to as being distributed, i.e., distributed firewall (DFW) and distributed load balancer (DLB).

In some embodiments, a PE provides DFW service at a VNIC by enforcing a set of firewall rules to allow or rejects packets through the VNIC (to or from the corresponding VM). In some embodiments, the network manager 110 receives firewall configuration specification from the tenants and distributes corresponding firewall rules to various points of enforcement in the network 100.

In some embodiments, a PE provides DLB service at a VNIC by intercepting packets through the VNIC with a particular virtual address as destination. The DLB service then distributes the intercepted packets to one of a set of physical destinations that are mapped to the particular virtual address in order to balance traffic or computation load. In some embodiments, the network manager 110 provides definitions of virtual addresses and their corresponding set of physical addresses to the PEs.

FIG. 2 also illustrates a centralized troubleshooting tool (CTT) 200 that is used by the user to monitor and debug the distributed virtual network environment 100. The troubleshooting tool 200 provides a user interface for debugging and monitoring the various LRs, network services, and VMs of the distributed virtual network environment 100. It is running in the network manager 110 and uses the MPC to monitor (i.e., receive monitored data from) the controllers 121-122 and the host machines 131-133. The tool 200 allow the user to invoke commands on different PEs in order to collect information about the LRs and the services running in those PEs. This allows the user to compare and analyze the information from different PEs for a same LR or a same network service.

In some embodiments, the troubleshooting tool allows the user to view debugging information from different PEs all in a same view. In some embodiments, the tool 200 allows user to view the debugging information regarding a particular LR or a particular network service from all of the PEs implementing the particular LR or the particular network service in a same view. For example, the operations of the logical switch 221 spans the host 131, 132 and the controller 121 (i.e., the logical switch is operating in host machines 131-132 and is controlled by the controller 121). The tool 200 facilitates the debugging of the logical switch 221 by having information regarding the logical switch 221 from the host machines 131, the host machine 132, and the controller 121 in a same view. As another example, VNICs of the host machines 131-133 are providing DFW services. The tool 200 facilitates the debugging of the DFW by providing a command that lists all VNICs in the host machines 131-133 that have rules for performing the DFW.

Several more detailed embodiments of the invention are described below. Section I discusses the centralized troubleshooting tool in greater detail. Section II describes context sensitive whitelisting of commands for the centralized troubleshooting tool. Section III describes a computing device that operates virtualization software and serves as a host machine. Finally, section IV describes an electronic system with which some embodiments of the invention are implemented.

I. Centralized Trouble Shooting Tool

Figure 3:
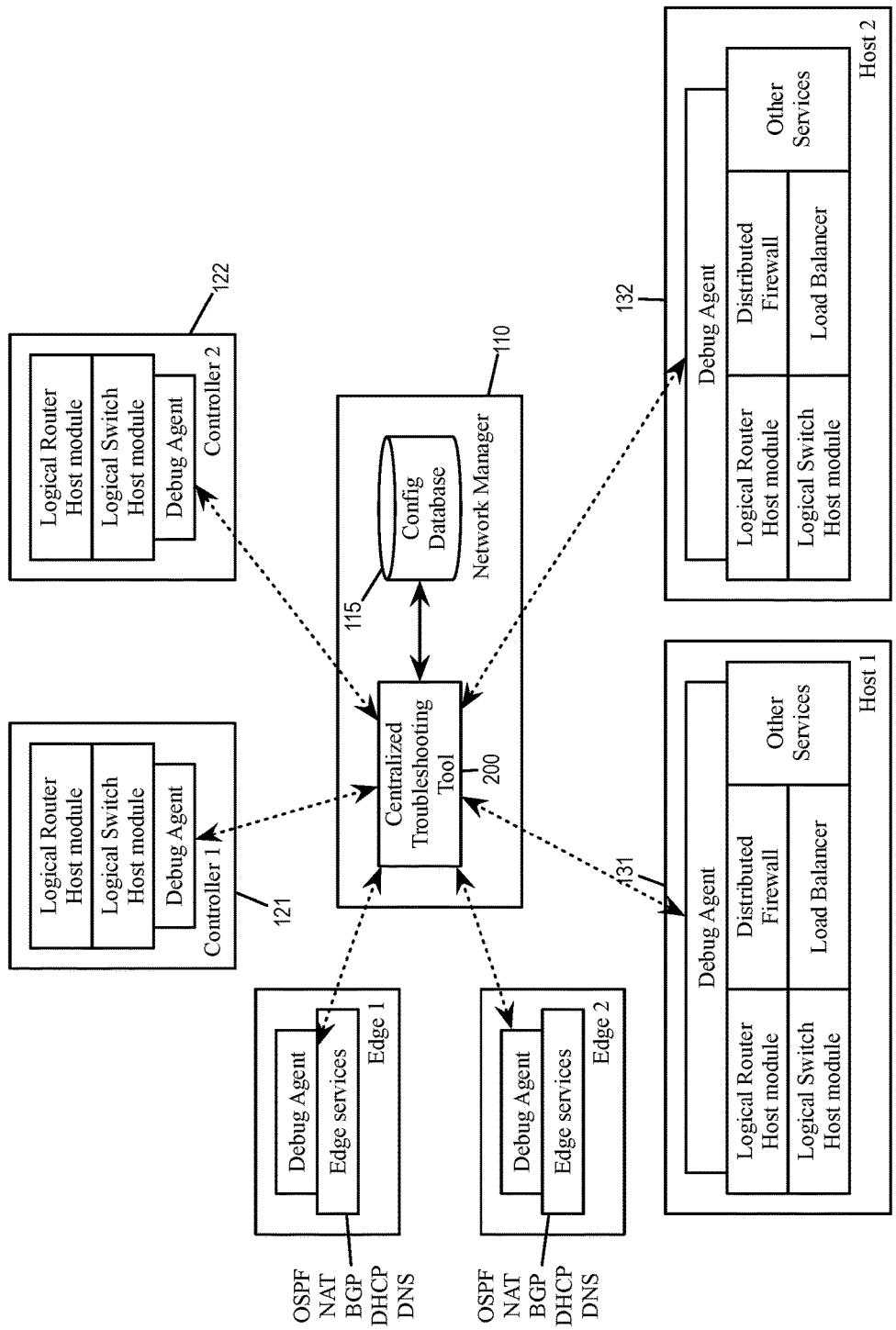
FIG. 3 illustrates a centralized troubleshooting tool (CTT) that is monitoring a distributed virtual network.

FIG. 3 illustrates the centralized troubleshooting tool (CTT) 200 that is monitoring the distributed virtual network environment 100 in greater detail. The CTT 200 is running in the network manager 110 and is in communication with all PEs of the distributed virtual network environment 100.

As illustrated, the CTT 200 is in communication with PEs such as the controllers 121-122, host machines 131-132, and edge appliances 141-142. The host machines 131 and 132 are running local instances of the various LRs (e.g., logical router controller module in the controller 121, the logical switch host module in the host 132, etc.) These host machines are also providing network services such as firewall and load balancer, as well as some partner services provided by third parties. The edge appliances 141 and 142 on the other hand are providing services such as OSPF, NAT, BGP, DHCP, and DNS at the edges of the network 100 interfacing external networks.

Each of the PEs (the controllers 121-122, the host machines 131-132, and edge appliance 141-142) also has debugging agents that provide debugging services to the outside world. In some embodiments, the debugging services of a PE is provided to allow the user to monitor/debug/troubleshoot the operations of the PE. For a PE that is operating VMs and LRs, the debugging services of the PE allows debugging operations with regards to those VMs and/or the LRs. In some embodiments, such a PE is running a hypervisor (virtualization software) for hosting the VMs and the LRs, and the debugging agent is a software module within the hypervisor.

The CTT 200 is in communication with the various debugging services running in the various PEs in order to monitor/debug/troubleshoot the PEs. Such communications exposes debugging services available in these PEs to the user. In some embodiments, the CTT 200 presents the data provided by such communications (from the debugging agents of the PEs) in a same view through a user interface component that utilize either graphical user interface (GUI) and/or command line interface (CLI). The CTT is also in communication with a configuration database 115 at the network manager. Such a configuration manager stores configuration data of various LRs and network services (such as DFW rules and DLB physical next hop addresses). The CTT 200 in some embodiments fetches data from configuration database 115 to allow comparison between the desired configuration stored at the network manager and the actual configuration implemented at the PEs. Some embodiments present data collected from the PEs by referencing the configuration data retrieved from the configuration database, e.g., by highlighting the discrepancy between the actual configuration collected from the PEs and the desired configuration retrieved from the configuration database, or by associating identifying information retrieved from the configuration database with status collected from the PEs.

Figure 4:
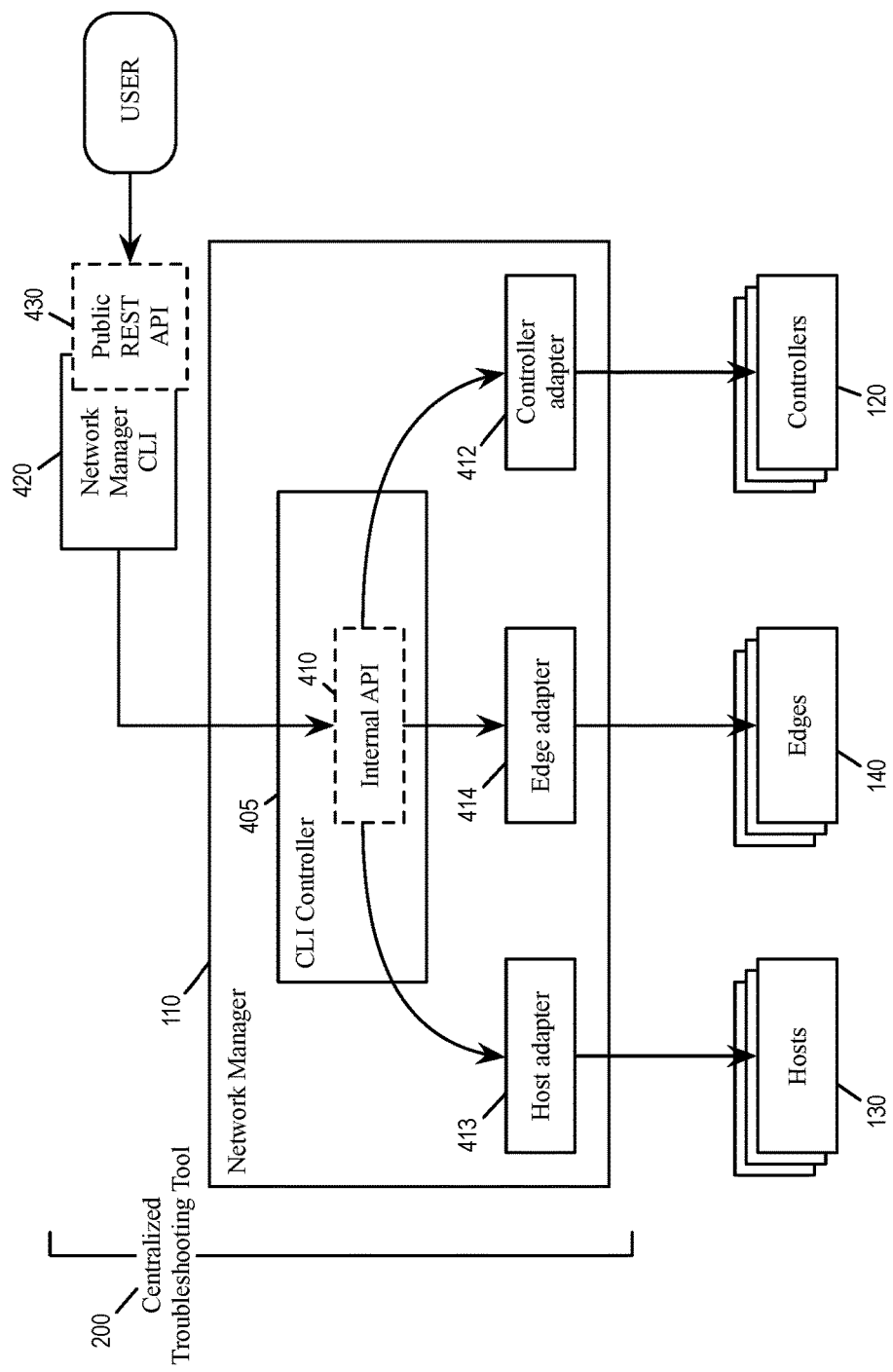
FIG. 4 illustrates various components of a centralized troubleshooting tool.

FIG. 4 illustrates the various components of the centralized troubleshooting tool 200 for some embodiments of the invention. The CTT 200 comprises components that operate in the network manager 110 while providing interface components for using the CTT. The CTT components operating in the network manager 110 includes a CLI controller 405, a controller adaptor 412, a host adapter 413, and an edge adapter 414. The components provided for using the CTT include a network manager CLI 420.

The controller adapter 412, the host adapter 413, and the edge adapter 414 provide the façade between the PEs and the CLI controller 405 (hence also referred to as PE adaptors). The controller adapter 412 is for communicating with the controllers 120 (i.e., 121-123), the host adapter 413 is for communicating with the host controllers 130 (i.e., 131-133), and the edge adaptor 414 is for communicating with the edge appliances 140. In some embodiments, the types of adaptors needed are defined differently than the example shown in FIG. 4. For example, in some embodiments, CTT provide different PE adaptors for different corresponding communication protocols. In some embodiments, CTT provides different PE adaptors for different manufactures.

In some embodiments, an adaptor of a PE is responsible for handling the communication with the PE. An adaptor does so by providing an interface/translation between the internal signaling of the CTT and the signaling of the PE. In some embodiments, each of the PE adapters 410 may be implemented with Telnet/SSH Channel, Message Q, or HTTP channels, depending what is the existing MPC between the NM and the PEs. In some embodiments, the message format between the PE adapters 410 and their corresponding PEs is plain text so that existing debugging modules/agents/services in any PE can be preserved and need not change. In some embodiments, such signaling with the PE includes the exchange of necessary login information on behalf of the user of the CTT.

The CTT 110 provides also multiple sets of application programming interface (API) for using the CTT to troubleshoot and monitor the various PEs, LRs, and services operating in the virtual network environment 100. As illustrated, the network manager CLI 420 provides a set of public/external facing APIs 430 for the user interface to call in order to use the network manager CLI 420, while the CLI controller 410 includes a set of internal APIs 410 that are called by the network manager CLI 420 to translates CLI commands from into communications with the PEs through the PE adaptors 412-414. In some embodiments, the APIs 410 and 430 facilitate user interface actions by complying with REST (Representational State Transfer, which for some embodiments is a stateless, client-server, cacheable communications protocol that uses the HTTP protocol). In some of these embodiments, the user of the CTT is using a REST interface, while the CLI controller 405 at the network manager 110 is a REST controller.

Figure 5:
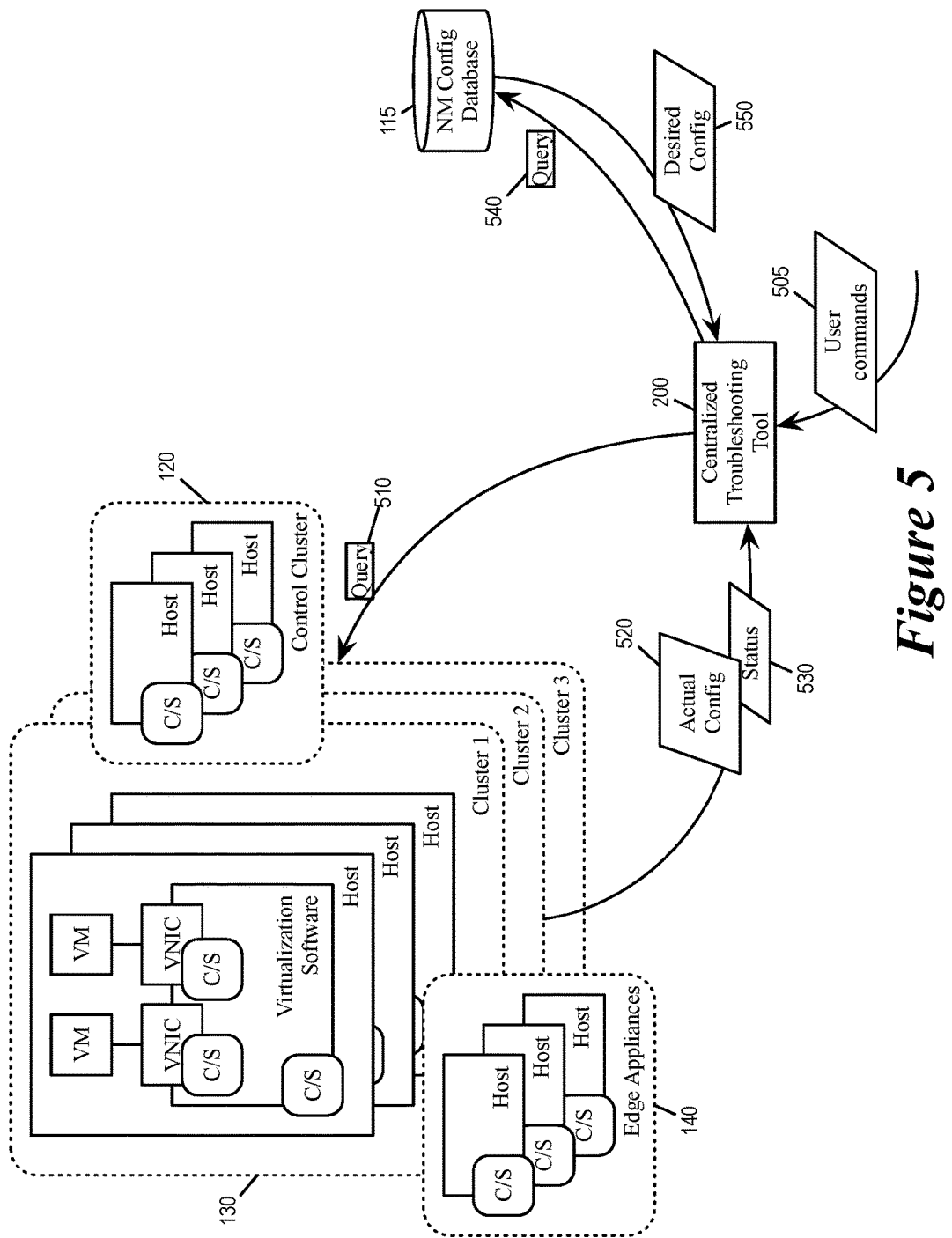
FIG. 5 illustrates the dataflow between a CTT and various physical endpoints (PEs) due to the invocation of troubleshooting commands.

FIG. 5 illustrates the dataflow between the CTT and the various PEs due to the invocation of troubleshooting commands by the user through the CTT's CLI. As illustrated, the CTT 200 is in communication with the controllers 120, the host machines 130 and the edge appliances 140. The CTT is also in communication with the configuration database 115 at the network manager.

As illustrated, each host machine of the host machines 130 is operating virtualization software (also referred to as hypervisors, virtualization monitors, or managed forwarding elements) in order to host a set of VMs. Each VM communicates through VNICs provided by the virtualization software in order to send and receive packet network packet traffic. Each host machine stores a set of configuration data for implementing the various LRs and network services. Some of these configuration data are applied at the VNICs provided by the virtualization software, while other configuration data are applied to other functional components provided by the virtualization software (such as the MPSE or MPRE). Each host machine also maintains a set of status and/or statistics regarding the operations of the LRs and of the network services implemented at the host machine. (In the figure, a set of configuration data, status, and statistics associated with a functional block is illustrated as a "C/S" block attached to the functional block).

The figure illustrates the controllers 120 and the edge appliances 140 as being part of the host machines 130, because some of the edge appliances and the controllers are implemented as VMs hosted by the host machines 130. In some embodiments, at least some of the edge appliances are dedicated edge devices rather than being implemented by VMs.

In some embodiments, the host machines 130 are organized into clusters. In some embodiments, host machines of a particular cluster are configured to serve as the controllers 120, and the particular cluster is referred to as a control cluster.

Each of the edge appliances 140 operates according to a set of configuration data and maintains a set of status/statistics in order to implement various edge network services at the edge of the network. Likewise, each of the controller 120 also operate according to a set of configuration data and maintains a set of status/statistics. This configuration data allows the controllers to control the operations of the LRs in the host machines.

As illustrated, the CTT 200 receives user command 505 (through public API 430 and network manager CLI 420) and interprets/translate the command into queries 510 to one or more PEs (can be host machines, edge appliances, or controllers). In response, the PEs sends back requested portions of the stored configuration data 520 and/or status and statistics 530 according to the query. The CTT then collects the data from the responses from the different PEs into a uniform presentation regarding the queried LR or network services. In some embodiments, a uniform presentation of a queried LR or network service comprises presenting the information gathered from different PEs in one view. In some embodiments, presenting the information gathered from different PEs (hosts and/or controllers) "in one view" means to present the information in one user viewable arrangement. For example, some embodiments present the information gathered from different PEs in one table. Some embodiments present the information gathered from different PEs in one GUI item (such as one scrollable window). Some embodiments present the information gathered from different PEs in one CLI text line. Some embodiments place information from different PEs regarding a same LR in a same viewable arrangement. FIGS. 7*a-b* below illustrates example screenshots of CTT commands in which information collected from different PEs are in a uniform presentation, or "in one view".

As mentioned, the configuration data stored in the host machines, controllers and edge appliance are the actual configuration data being used to control the operations of the LRs and the network services, while the network manager stores (at the configuration database 115) the desired configuration data that is specified by the user. The actual configuration data and the desired configuration data may be different because of delay between the time the user updates the desired configuration data and the time the update is propagated to the PEs as actual configuration data, or because of error conditions. In some embodiments, as illustrated, some of the CLI command results in queries 540 to the configuration database of the network manager. The network manager in response delivers the requested portion of the desired configuration data 550 to the CTT, which allows the CTT or its users to identify discrepancies between the actual configuration data and the desired configuration data.

Figure 6:
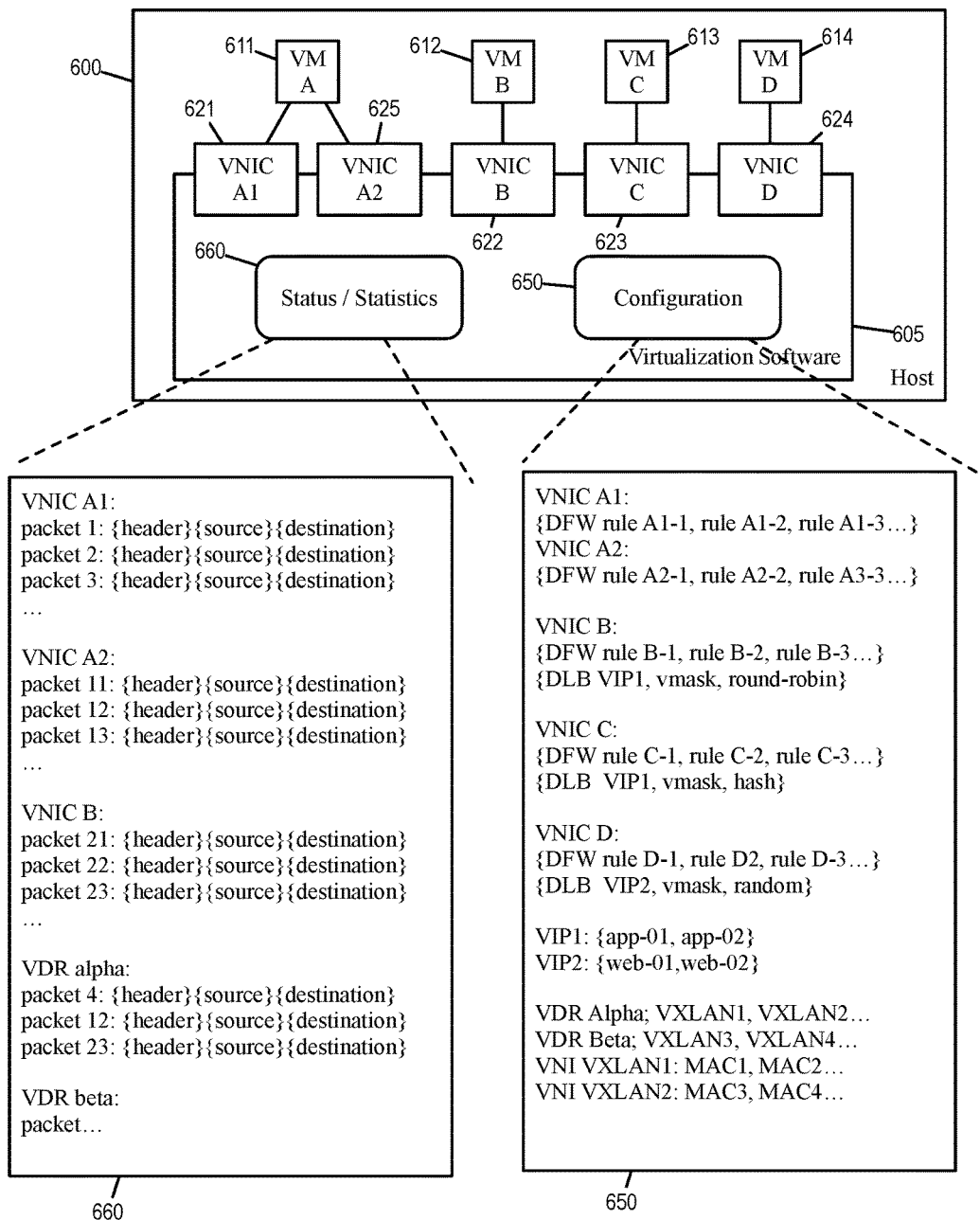
FIG. 6 illustrates an example host machine that stores configuration data, status, and statics for LRs and network services implemented at the host machine.

FIG. 6 illustrates an example host machine 600 that stores configuration data 650 as well as status and statics 660 for LRs and network services implemented at the host machine. When queried by a CTT, the host machine provides corresponding portions of the configuration data and/or status as response to the query. As illustrated, the host machine 600 is operating virtualization software 605 and hosting VMs 611-614 (VMs A, B, C, and D). The VM 611 communicates with the virtualization software as well as the network 100 through the VNICs 621 and 625. The VM 612-614 communicates with the virtualization software as well as the network 100 through the VNICs 622-624, respectively.

The configuration data 650 includes specification for network services that are to operate at VNICs 621-625 as well as at other components of the virtualization software 605. For example, according to the configuration data 650, the VNIC A1 621 is configured to perform DFW operations according to firewall rules A1-1, A1-2, etc., the VNIC A2 625 is configured to perform DFW operations according to firewall rules A2-1, A2-2, etc. The VNICs B, C, and D 622-624 are each configured to provide DLB services based on parameters that specifies a virtual destination address (VIP1 or VIP2), a mask that enables and disables certain next hops (vmask), and a load-balancing criteria or method for selecting the next hop (round-robin, hash, or random). The configuration data 650 also enumerated the possible physical destinations for each of the DLB virtual address (physical address app-01 and app-02 for the virtual address VIP1 and physical addresses web-01 and web-02 for virtual address VIP2). The configuration data 650 also configures the virtualization software 650 to implement several logical routers and switches. For example, the configuration data specifies logical routers (VDR Alpha and VDR Beta) as well as several logical switches (VXLAN1 and VXLAN2) that are to be implemented by the virtualization software.

One of ordinary skill would understand that the virtualization software in different embodiments may store different parameters in the configuration data or employ different format when storing the configuration data than what is illustrated in FIG. 6. For example, in some embodiments, the DLB parameters of a VNIC may include different sets of parameters, such as a set of possible next hop locations identified by their MAC addresses or IP addresses.

The status and statistics 660 records certain types of events that occur within the host machine, events such as the number and the type of packets passing through each individual VNIC. In the illustrated example, the status and configuration 660 includes records of packets passing through VNICs 621-625 (VNICs A1, A2, B, C, and D). Each record of a packet passing through a VNIC includes header of the packet, the source of the packet, and the eventual fate of the packet (reaching a particular destination due to DLB, discarded due to DFW, etc.). This information can be retrieved and delivered to the CTT in response to troubleshooting commands.

FIGS. 7*a-b* illustrates several CLI screen shots 701-706 that show the invocation of some example CTT CLI commands. Each screenshot of a CLI command includes presentation of the status/statistics/configuration data that are retrieved from the PEs of the network in response to the CLI command.

The screenshot 701 shows the invocation of a command for listing the host machines in a cluster called "domain-c181", which displays basic information and status about two host machines named "dfwhostA" and "dfwhostB". The screenshot 702 shows the invocation of a command for listing the VMs in the host "dfwhostA", which displays basic information and status about two VMs "vm84" and "vm85". In some embodiments, information regarding the identities of VMs and host machines are retrieved from configuration database (e.g., 115) of the network manager, while the status of the host machines and the VMs (such as whether a VM is powered on or off, or whether a host machine is ready or not ready) are obtained by querying the PEs (e.g., from status and statistics 660).

The screenshot 703 shows the invocation of a command that lists detailed information about a VM, specifically to list the VNICs that the VM is connected with, and the filters that associated with each VNIC. In some embodiments, each filter associated with a VNIC includes sets of firewall rules that are to be enforced at the VNIC. According to the screenshot 703, the VM "vm84" has two VNICs 711 and 712. The VNIC 711 has three filters 721-723, while the VNIC 712 has a filter 724.

The screenshot 704 shows the invocation of a command that lists the rules inside a filter. Specifically, the screenshot lists the rules associated with the filter 721 associated with the VNIC 711. In some embodiments, the information regarding the firewall rules associated with VNICs are obtained by querying the PEs for DFW related data (such as from the configuration data 650) or by retrieving the configuration data from the configuration database of the network manager.

The screenshot 705 shows the invocation of a command for displaying information on network flows (i.e., transport connections or L4 connections) through a VNIC filter. The screenshot 706 shows the invocation of a command for displaying the statistics for individual rules of the filter, e.g., the number of packets evaluated by the rule and the number of packets blocked because of the rule. In some embodiments, the CTT obtain status and statistics of DFW operations by retrieving status and statics from host machine that operates the DFW (e.g., from status and statistics 660).

The CTT provides a suite of commands for monitoring and troubleshooting different types of LRs and services. Some embodiments provide commands for different types of LRs and services under different context or modules in CTT, where each context corresponds to one type of LRs or one type of network services. In some embodiments, the different types of LRs and network resources that have corresponding contexts in the CTT include logical router, logical switch, distributed firewall (DFW), distributed load balancer (DLB), and edge services. The commands illustrate in FIGS. 7a-b above belong to DFW context. In addition to commands that fall under one of the CTT contexts, some embodiments also provide commands that are common to all contexts and thus available to all types of users. Tables 1 through 6 below list the commands that are available under each context. For each command, each table lists its CLI invocation form and its description.

TABLE 1

Commands in DFW Context:

| CLI command | Description |
| --- | --- |
| show dfw cluster all | Show all clusters protected by DFW |
| show dfw cluster <cluster-id> | Show all hosts in the cluster cluster-id |
| show dfw host <host-id> | Show all the VMs protected by DFW on a host host-id |
| show dfw vm <vm-id> | Show all the vnics protected by DFW on the given vm-id |
| show dfw vnic <vnic-id> | show all filters information configured on the given vnic-id |
| show dfw host <host-id> filter <filter-name> rules | show all the firewall rules configured on a filter-name on the vnic-id |
| show dfw host <host-id> filter <filter-name> addrsets | show the container details used by all the rules on the given filter |
| show dfw host <host-id> filter <filter-name> flows | show the active, inactive, drop, reject flows on the given filter |
| show dfw host <host-id> filter <filter-name> spoofguard | show the spoofguard details on the given filter |
| show dfw host <host-id> filter <filter-name> stats | show the detailed packet statistics on the given filter |
| show dfw host <host-id> filter <filter-name> rule <rule-id> | show the details of a single rule on the given filter and given rule id |
| show dfw host <host-id> filter <filter-name> discoveredips | show the discovered VM IPs for virtual nic filter |
| show dfw host <host-id> filter <filter-name> discoveredips stats | show stats for the discovered VM IPs for virtual nic filter |
| show dfw host <host-id> summarize-dvfilter | show summary of DVFilter |

TABLE 2

Commands in DLB Context

| | Description |
| --- | --- |
| Read Command | |
| show dlb host <host-id> filter <filter-id> addrset <addrset-name> validity show | Get the vmask values of all IP addresses in a given addrset |
| show dlb host <host-id> filter <filter-id> addrset <addrset-name> stats table | Get the Statistics on addrsets |
| show dlb host <host-id> filter <filter-id> addrset <addrset-name> stats entry | Get the Statistics on addrsets |
| show dlb host <host-id> filter <filter-id> addrset <addrset-name> stats all | Get the Statistics on addrsets |
| Enable Mode | |
| set dlb host <host-id> filter <filter-id> addrset <addrset-name> ip <ipaddr> validity enable | manually change the vmask value |
| set dlb host <host-id> filter <filter-id> addrset <addrset-name> ip <ipaddr> validity disable | manually clear the vmask value |
| clear dlb host <host-id> filter <filter-id> addrset <addrset-name> stats clear | Reset the addrset statistics |

As illustrated in Table 2, the CLI supports several commands that allow the user of the CLI to obtain status and statistics regarding each of a set of addresses ("addrsets") that serve as possible destinations of the load-balancer (e.g., number of packets dispatched to each of the eligible destinations of the load-balancer from the filter point at the VNIC). In some embodiments, some of the CTT contexts provide commands that allow the user to make changes to the configuration data and thereby affects the operations of the LRs and/or the network services (such as the set dlb command in the DLB context that changes the vmask at a PE.) Some of the commands allows the user to clear certain statistics being kept at the PEs (such as the clear dlb command in the DLB context).

TABLE 3

Commands in Edge Context:

| CLI Command | Description |
| --- | --- |
| show edge <edge-id> version | Show the version running on a given edge |
| show edge <edge-id> process list | Show the process list on a given edge |
| show edge <edge-id> process snapshot | Show the process snapshot on a given edge |
| show edge <edge-id> system cpu | Show the system CPU on a given edge |
| show edge <edge-id> system memory | Show the system memory status on a given edge |
| show edge <edge-id> system storage | Show the system storage capacity |
| show edge <edge-id> system network-stats | Show the system network statistics |
| show edge <edge-id> messagebus forwarder | Show the message bus forwarder on a given edge |
| show edge <edge-id> messagebus messages | Show the messages on a message bus on a given edge |
| show edge <edge-id> eventmgr | Show the event manager on a given edge |
| show edge <edge-id> log | Show the log on a given edge |
| show edge <edge-id> configuration [FEATURE] | Show configuration on a given edge |
| show edge <edge-id> configuration provider-ipset | Show provider's ipset configuration |
| show edge <edge-id> configuration provider-appset | Show provider's appset configuration |
| show edge <edge-id> interface <interface-id> | Show a specific interface on a given edge |
| show edge <edge-id> firewall | Displays firewall packet counters along with firewall rules that specify what to do with a packet that matches. |
| show edge <edge-id> firewall flows topN NUM | Show firewall flows on a given edge |
| show edge <edge-id> flowtable | Show flow table on a given edge |
| show edge <edge-id> flowtable rule-id <ID> | Show flow table on a given edge for a particular rule |
| show edge <edge-id> ipset | Show the IP set on a given edge |
| show edge <edge-id> nat | Show NAT details on a given edge |
| show edge <edge-id> ip bgp | Show BGP information on a given edge |
| show edge <edge-id> ip bgp neighbors | Show BGP neighbors on a given edge |
| show edge <edge-id> ip forwarding | Show ip forwarding on a given edge |
| show edge <edge-id> ip ospf | Show OSPF details on a given edge |
| show edge <edge-id> ip ospf database | Show the OSPF database on a given edge |
| show edge <edge-id> ip ospf interface | Show OSPF interface details on a given edge |
| show edge <edge-id> ip ospf neighbor | Show OSPF neighbors on a given edge |
| show edge <edge-id> ip route | Show the ip routing table on a given edge |
| show edge <edge-id> service loadbalancer | Show the status of the load balancing service on a given edge |
| show edge <edge-id> service loadbalancer error | Show errors on the load balancing service on a given edge |
| show edge <edge-id> service monitor | Show service monitoring on a given edge |
| show edge <edge-id> service monitor service name | Show service monitoring on a given edge |
| show edge <edge-id> service ipsec | Show IPSEC details on a given edge |
| show edge <edge-id> service ipsec site | Show IPSEC details on a given edge |
| show edge <edge-id> service highavailability | Show HA information on a given edge |
| show edge <edge-id> service highavailability internal | Show internal HA information on a given edge |
| show edge <edge-id> service dhcp | Show DHCP service information on a given edge |
| show edge <edge-id> service dhcp leaseinfo | Show the lease information on a given edge |
| show edge <edge-id> service dns | Show the status of the DNS service on a given edge |
| show edge <edge-id> arp | Show the arp table on a given edge |

TABLE 4

Commands in Logical Router Context:

| CLI command | Description |
| --- | --- |
| show logical-router list all | show all logical routers |
| show logical-router list dlr <edge-id> host | show hosts for a given logical router |
| show logical-router host <host-id> dlr <edge-id> brief | show general information about a logical router on a given host |
| show logical-router host <host-id> dlr <edge-id> verbose | show detailed information about a logical router on a given host |
| show logical-router host <host-id> dlr <edge-id> interface all brief | show general information about all logical router interfaces on a given host |
| show logical-router host <host-id> dlr <edge-id> interface all verbose | show detailed information about all logical router interfaces on a given host |
| show logical-router host <host-id> dlr <edge-id> route | show information about logical router routes on a given host |
| show logical-router host <host-id> dlr <edge-id> arp | show information about logical router arp table on a given host |
| show logical-router host <host-id> dlr <edge-id> tunable | show tunable parameters about logical router on a given host |
| show logical-router host <host-id> connection | show all logical router connections on a given host |
| show logical-router host <host-id> dlr <edge-id> interface <lif-id> brief | show general information about an interface of a logical router interfaces on a given host |
| show logical-router host <host-id> dlr <edge-id> interface <lif-id> verbose | show detailed information about an interface of a logical router interfaces on a given host |
| show logical-router host <host-id> dlr <edge-id> interface <lif-id> statistics | show statistics information about an interface of a logical router interfaces on a given host |

TABLE 4-continued

Commands in Logical Router Context:

| CLI command | Description |
| --- | --- |
| show logical-router host <host-id> dlr <edge-id> bridge <bridge-id> verbose | show detailed information about a bridge of a logical router interfaces on a given host |
| show logical-router host <host-id> dlr <edge-id> bridge <bridge-id> mac-address-table | show mac address table about a bridge of a logical router interfaces on a given host |
| show logical-router host <host-id> dlr <edge-id> bridge <bridge-id> statistics | show statistics information about a bridge of a logical router interfaces on a given host |
| show logical-router host <host-id> dlr <edge-id> control-plane-statistics | show overall statistics information about layer 3 on a given host |
| show logical-router controller <controller-id> statistics | show statistics information on a given controller |
| show logical-router controller <controller-id> host <host-id> connection | show host connection on a given controller |
| show logical-router controller <controller-id> dlr <edge-id> brief | show general information about a logical router on a given controller |
| show logical-router controller <controller-id> dlr <edge-id> interface | show interface of a logical router on a given controller |
| show logical-router controller <controller-id> dlr <edge-id> route | show routes of a logical router on a given controller |
| show logical-router controller <controller-id> dlr <edge-id> statistics | show statistics of a logical router on a given controller |
| show logical-router controller <controller-id> dlr <edge-id> interface <lif-id> | show general information about an interface of a logical router on a given controller |
| show logical-router controller <controller-id> dlr <edge-id> route <ip-address/prefix-length> | show route information about a network of a logical router on a given controller |
| show logical-router controller <controller-id> dlr <edge-id> bridge all | show general information about all bridges of a logical router on a given controller |
| show logical-router controller <controller-id> dlr <edge-id> bridge all mac-address-table | show mac address table about all bridges of a logical router on a given controller |
| show logical-router controller <controller-id> dlr <edge-id> bridge <bridge-id> | show general information about a bridge of a logical router on a given controller |
| show logical-router controller <controller-id> dlr <edge-id> bridge <bridge-id> mac-address-table | show mac address table about a bridge of a logical router on a given controller |

TABLE 5

Commands in Logical Switch Context:

| CLI command | Description |
| --- | --- |
| show controller list all | show controller list |
| show logical-switch list all | show logical switch list |
| show logical-switch list vni <vni> host | show host list for a logical switch |
| show logical-switch list host <host-id> vni | show logical switch list for a host |
| show logical-switch host <host-id> verbose | show detailed information about logical switches on a given host |
| show logical-switch host <host-id> config-by-vsm | show config file pushed by vsm on a given host |
| show logical-switch host <host-id> statistics | show all logical switch statistics information on a given host |
| show logical-switch host <host-id> vni <vni> verbose | show detailed information about a logical switch on a given host |
| show logical-switch host <host-id> vni <vni> mac | show mac address table about a logical switch on a given host |
| show logical-switch host <host-id> vni <vni> arp | show arp table about a logical switch on a given host |
| show logical-switch host <host-id> vni <vni> vtep | show vtep list information about a logical switch on a given host |
| show logical-switch host <host-id> vni <vni> statistics | show statistics information about a logical switch on a given host |
| show logical-switch host <host-id> vni <vni> port <port-id> statistics | show statistics information about a logical switch port on a given host |
| show logical-switch controller <controller-id> vni <vni> brief | show general information about a logical switch on a given controller |
| show logical-switch controller <controller-id> vni <vni> mac | show mac address table about a logical switch on a given controller |
| show logical-switch controller <controller-id> vni <vni> vtep | show vtep list about a logical switch on a given controller |
| show logical-switch controller <controller-id> vni <vni> arp | show arp table about a logical switch on a given controller |
| show logical-switch controller <controller-id> vni <vni> connection | show connection information about a logical switch on a given controller |
| show logical-switch controller <controller-id> vni <vni> statistics | show statistics information about a logical switch on a given controller |

TABLE 5-continued

Commands in Logical Switch Context:

| CLI command | Description |
| --- | --- |
| show logical-switch controller <controller-id> host <host-id> mac | show mac address table about a host on a given controller |
| show logical-switch controller <controller-id> host <host-id> vtep | show vtep list about a host on a given controller |
| show logical-switch controller <controller-id> host <host-id> arp | show arp table about a host on a given controller |
| show logical-switch controller <controller-id> host <host-id> joined-vnis | show joined logical switch vnis about a host on a given controller |

TABLE 6

Commands Common to All Contexts:

| CLI Command | Description |
| --- | --- |
| show cluster all | Show all clusters |
| show cluster <cluster-id> | Show all hosts in the cluster cluster-id |
| show host <host-id> | Show all the VMs on a host host-id |
| show vm <vm-id> | Show all the vnics on the given vm-id |
| show vnic <vnic-id> | show all filters information configured on the given vnic-id |

Figure 8:
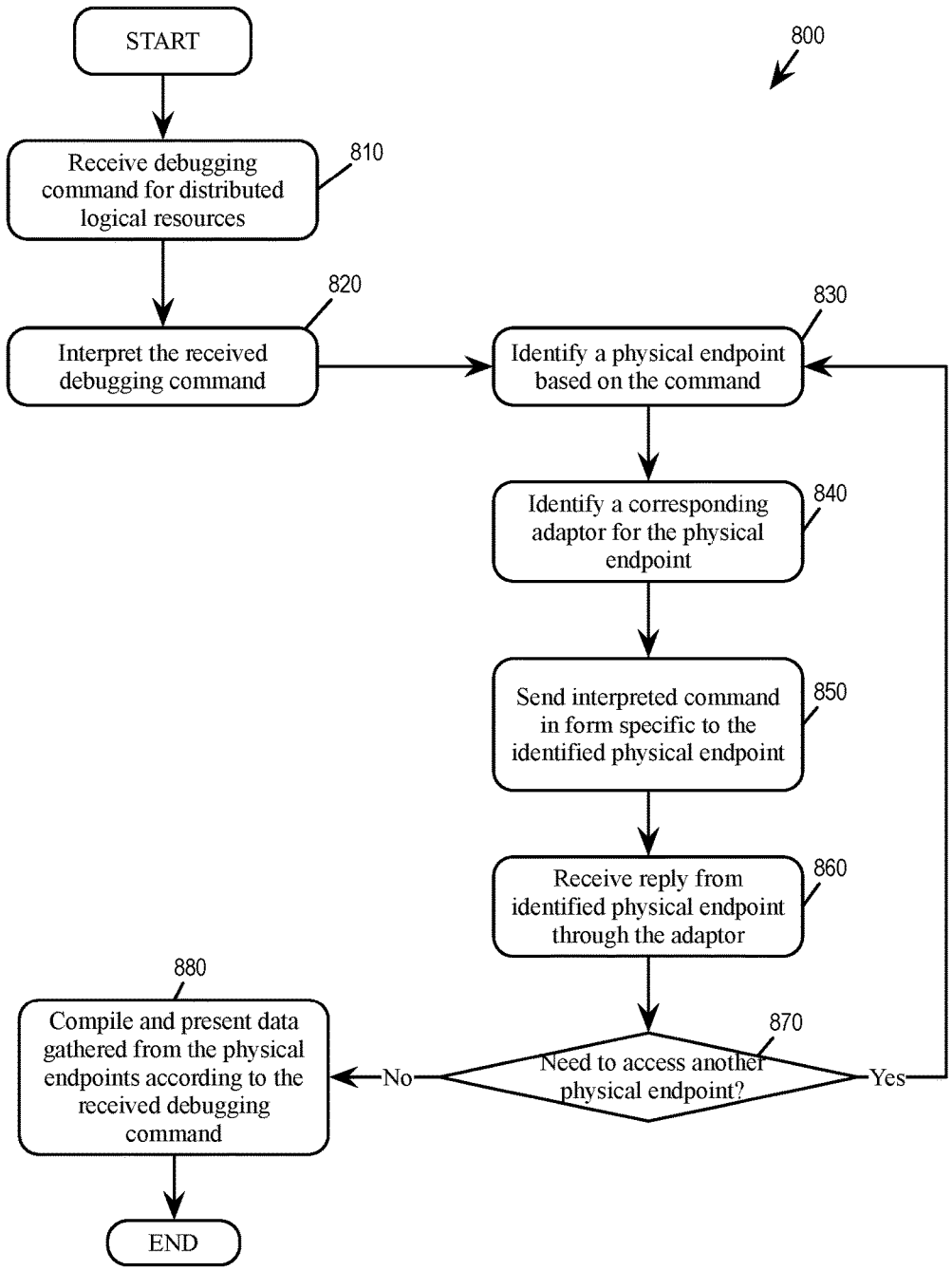
FIG. 8 conceptually illustrates a process for performing centralized debugging in a distributed virtual networking environment.

For some embodiments, FIG. 8 conceptually illustrates a process 800 for performing centralized debugging in a distributed virtual networking environment. In some embodiments, a network manager (e.g., 110) performs the process 800 when it operates a centralized troubleshooting tool (e.g., CTT 200).

The process 800 starts when it receives (at 810) a debugging/troubleshooting command for distributed logical resources. The received commands in some embodiments require access of LRs (such as logical routers and logical switches) or network services (such as DFW and DLB) that are distributed across multiple different PEs in a distributed virtual network environment (e.g., 100). Some embodiments receive this command through a CLI or a GUI of the centralized troubleshooting tool. Tables 1-6 above enumerate some of the commands that the centralized troubleshooting tool supports to facilitate the troubleshooting of the virtual network environment.

The process then interprets (at 820) the received debugging command. The network manager in some embodiments interprets the received debugging command/troubleshooting inquiry by using the internal API (i.e., 410). The process then identifies (at 830) a physical endpoint (PE) based on the interpreted command (i.e., based on the identified centralized trouble shooting services for the received debugging command). Such a PE can be a host machine, a controller, an edge appliance, or any other types of devices that serve as an endpoint in the distributed virtual network environment. The process then identifies (at 840) a corresponding PE adaptor for the identified PE. As mentioned, in some embodiments, different devices serving as PEs may employ different communication protocols or data formats. The process therefore has to identify the correct corresponding PE adaptor in order to communicate properly with the identified PE.

The process then sends (at 850) the interpreted command (e.g., the identified centralized troubleshooting services for the debugging command) to the identified PE in a form understood by the identified PE. In some embodiments, based on the interpretation of the received command and the identified troubleshooting services, the process creates sub-command specific to the identified PE, and the corresponding PE adaptor then translate the sub-command into a form understood by the PE. The translated command is then transmitted to the identified PE to execute the debugging command. The process then receives (at 860) a reply from the identified PE through the PE's adaptor.

The process then determines (at 870) whether the interpreted debugging command requires the process to access another PE. A troubleshooting command may inquire about a LR that spans multiple PEs. A troubleshooting command my also inquire about PEs in a particular cluster. If the debugging command requires access of another PE, the process returns to 830. Otherwise the process proceeds to 880.

At 880, the process compiles and presents the data gathered from the PEs in accordance with the received debugging command. For example, if the command inquires information regarding VMs in a host machine, or VNICs associated with VMs, firewall rules enforced at a VNIC, etc., the process would process the data from those host machines and to present the data relevant to the inquiry about the network service in a coherent format (e.g., in one GUI item or in a same table in CLI). The process 800 then ends. The process 800 would start once again upon the reception of another debugging command from the CLI.

II. Context Sensitive Command Line Interface

As mentioned, in some embodiments, the CTT includes a CLI user interface. For advanced users, CLI is often preferred because they often provide a more concise and powerful means to control a program or operating system. One of the most powerful features of a CLI is its command history that allows the user to easily identify and reuse a previous command, or to modify a previous command into a new command. However, when using CLI to debug LRs or network services in a distributed networking environment, command history can be difficult to use. This is because LRs and network services are placed across different types PEs. This is also because the identities of the LRs and PEs, as well as the parameters of network services (such as DFW rules and DLB masks) are variables that can change dynamically. Furthermore, parameters for one type of command.

Some of the specific problems a user may encounter when using CLI in a distributed networking environment may include: (1) having no command history cache to use upon login; (2) creating an erroneous command that may damage the system when using the command history to create a new command; (3) having to use identifiers (for host machines, VMs, LRs, filters, etc.) that are meaningless and hard to remember.

Some embodiments provide an intelligent CLI that facilitates the troubleshooting of a distributed network by generating and inserting entries into the command history cache.

These generated entries were never entered by the "user but were created by the CLI and inserted into the command history cache for the user to use. In some embodiments, the CLI allows users to enter commands by using command prototypes that are easier to comprehend for human operators. The intelligent CLI in turn resolves the command prototypes into commands with actual identifiers of LRs and PEs. These resolved commands (with the actual identifiers of LRs and PEs) are inserted into the command history cache for use/re-use by the user. In some embodiments, the intelligent CLI preload the command history cache with a set of predetermined entries upon session initialization for user to use/re-use upon login. In some embodiments, the initially preloaded command history cache is specified by unresolved command prototypes, and the intelligent CLI resolves those preloaded command prototypes into actual identifiers of LRs and PEs. These inserted, resolved commands in the command history cache allows the user to quickly identify and reuse commands with actual identities of LRs and PEs for trouble shooting purposes. In some embodiments, the intelligent CLI resolves command prototypes and preloads commands into command history cache according to CLI configuration and recent user input commands. Further descriptions of intelligent CLI of a central troubleshooting tool can be found in U.S. patent application Ser. No. 14/839,075, filed on Aug. 28, 2015, titled "Centralized Troubleshooting Tool in Distributed Virtual Network", published as U.S. Patent Publication 2017/0063642, which is herein incorporated by reference.

Figure 9:
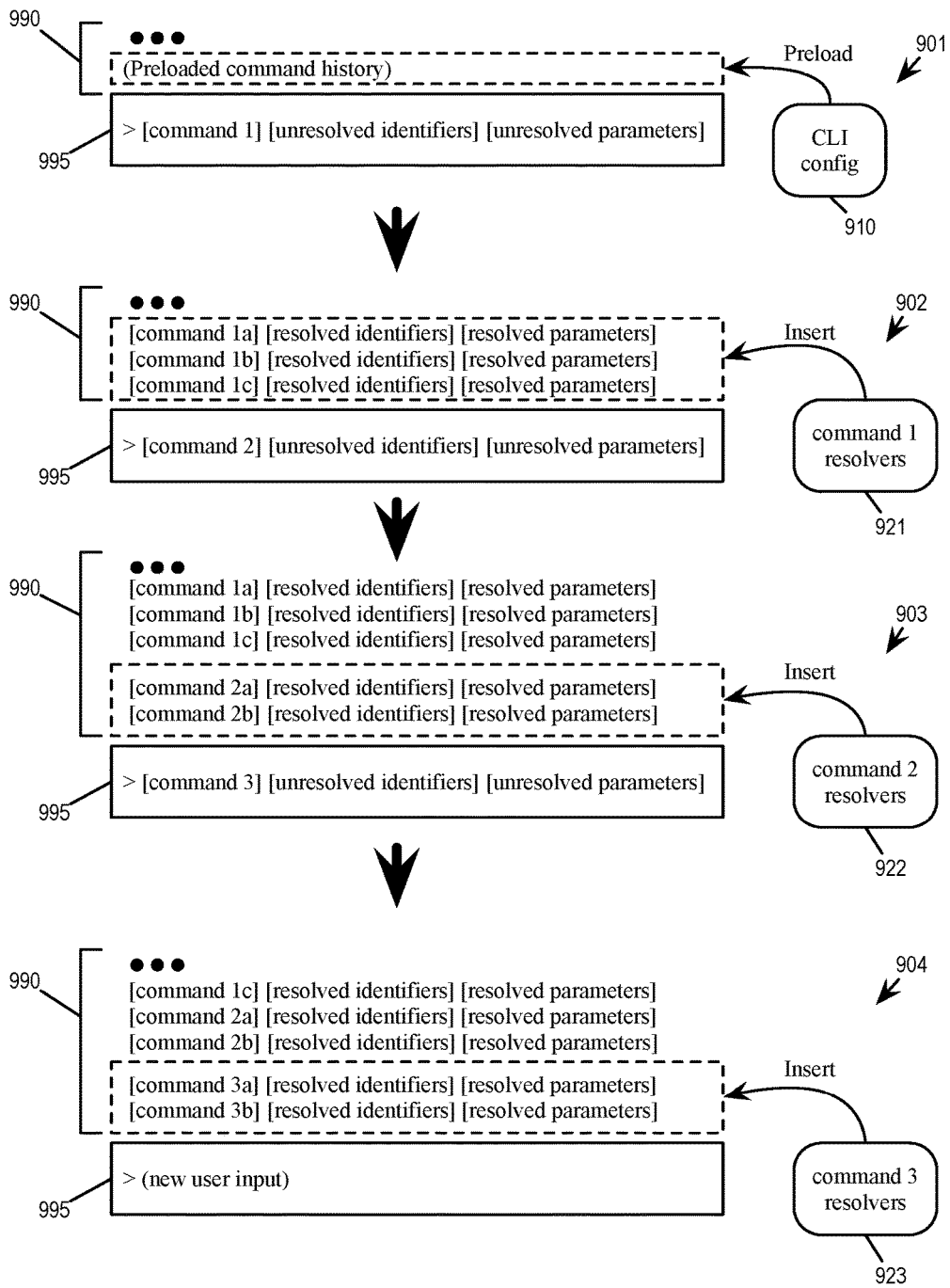
FIG. 9 illustrates the operations of a CTT CLI that automatically generates commands for insertion into command history cache.

FIG. 9 illustrates the operations of a CTT CLI that automatically generates commands for insertion into its command history cache. Upon initialization of the CLI (e.g., user login), the intelligent CLI preloads a command history cache 990 with a set of command prototypes that are specified by CLI configuration 910. Subsequent commands entered by the user through the CLI command line 995 are also entered into the command history cache. Some of these commands (entered by the user or preloaded by the CLI configuration) are command prototypes having unresolved parameters or identifiers. The intelligent CLI would resolve each unresolved command prototypes into one or more resolved commands/parameters/identifiers and insert the resolved commands/parameters/identifiers into the command history cache. FIG. 9 illustrates four such examples in four sequential stages 901-904.

The first stage 901 shows the preload of commands into the command history cache. These commands are from a CLI configuration 910, which in some embodiments specifies a set of commands that are to be preloaded into the command history cache for the user upon login or initialization. The stage 901 also show the user entering a first command "command 1" through command line 995, which has a set of unresolved identifiers and parameters.

The second stage 902 shows the resolution of "command 1" into resolved identifiers and parameters. The intelligent CLI identifies a set of resolvers for resolving command 1 ("command 1 resolvers" 921), which resolves "command 1" and its corresponding identifiers and parameters into "command 1a", "command 1b", and "command 1c", each having resolved identifiers and parameters. These resolved commands are then inserted into the command history cache 990. In the meantime, the user has entered a second command "command 2" through the command line 995, which also has a set of unresolved identifiers and parameters.

The third stage 903 shows the user entering a subsequent command "command 3" at the CLI as well as a resolver 922 resolving "command 2" and entering the corresponding resolved commands "command 2a" and "command 2b" into the command history cache 990. The fourth stage 904 shows a resolver 923 resolving "command 3" and entering the corresponding resolved commands "command 3a" and "command 3b" into the command history cache 990.

Figure 10:
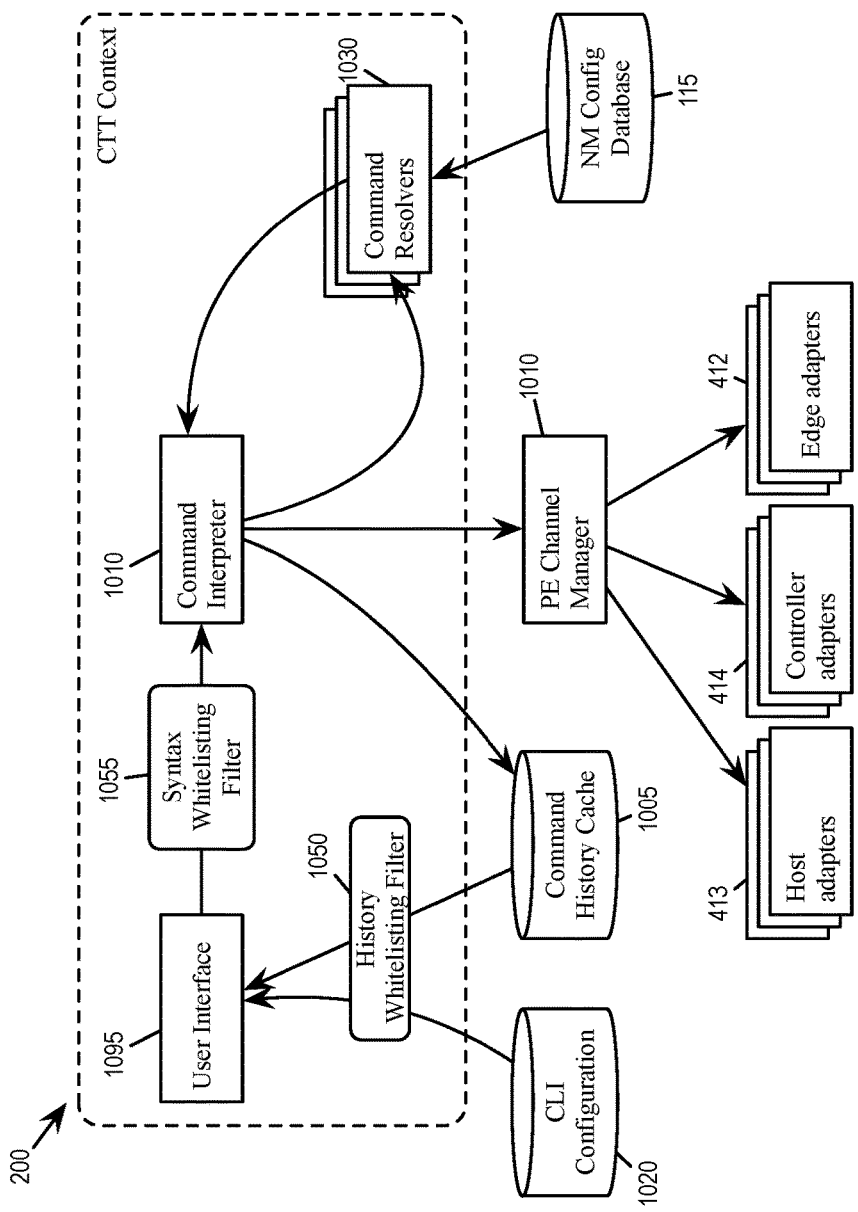
FIG. 10 illustrates various components of a CTT for interpreting and resolving CLI commands.

FIG. 10 illustrates various components of the CTT 200 for interpreting and resolving CLI commands. As illustrated, the CTT 200 includes a CLI interpreter module 1010, a command history cache 1005, a user interface unit 1095, a command resolvers 1030, a CLI configuration 1020, and a PE channel manager 1060.

The command interpreter 1010 interprets the received command and the command history cache 1005 saves past CLI user interactions for future reuse by the user. Based on the configuration data stored in the CLI configuration 1020 and the command history of current user session stored in the command history cache 1005, the command interpreter 1010 can insert some command prototypes into the command history cache 1005, which means, though some commands are not really executed by the user recently, they appear to the user as if they have been executed and user can simply populate his/her CLI and change some parameter values to re-invoke the commands.

The CLI Interpreter module 1010 loads static configuration from the CLI configuration 1020, interprets user inputs from user interface unit 1095, evaluate outputs of the commands, directs command resolvers 1030 to resolve unresolved command prototypes and add resolved commands to command history cache 1005. In some embodiments, the command interpreter 1010 uses the routines provided by the internal API 410 to interpret the received command.

The command resolver modules 1030 are used to resolve command prototypes and command identity parameters according to different information sources, such as the CLI configuration 1020 as well as command results from other resolved command prototypes. There are multiple command resolver modules that are used to resolve different types of commands as well as identities of LRs, network services, and PEs. The CTT 200 in some embodiments selects a corresponding resolver module for resolving each command and each identifier. Some embodiments use the CLI Configuration module 1020 to configure the command resolvers to handle different types of command prototypes.

The PE Channel Manager module 1060 manages the connections between the NM and the PEs to provide a responsive command channel (through PE adaptors 412-414). The PE Channel Manager can be configured to use a heartbeat command to test the channel between the NM and the remote PEs (including hosts, controllers, edge appliance). In some embodiments, for each channel, the PE channel manager 1060 activates an adaptive heartbeat between the NM and a PE. Operations of the PE channel manager can be found in U.S. patent application Ser. No. 14/839,075, which is incorporated herein by reference.

As mentioned, in some embodiments, the CTT can operate under one of several contexts. As illustrated in tables 1 through 6 above, each context has its own set of CLI commands and syntax requirement. Some identifiers only exist in certain contexts but not others. For example, in some embodiments, identifiers for DFW filters and rules only exist in DFW context, while identifiers for DLB virtual addresses and virtual masks only exist in DLB context. Invoking out-of-context commands and/or identifiers can potentially damage the system as a command resolvers 1030 may behave unpredictably when called to resolve out-of-context identifiers.

In some embodiments, a user using the CTT under a particular context would have commands interpreted and checked (whitelisted) under that particular context, i.e., only commands and parameters that "make sense", valid, or compatible with the particular context would be allowed to reach the PEs through their adaptors. Some embodiments also whitelist the command history cache, i.e., a user using a CTT under a particular context would only see command history that has been whitelisted for that context. In some embodiments, each context recognizes its own set of identifiers (e.g., maintained by as a listing or table), and a command is considered valid or compatible with a particular context only when all of its identifiers are recognized by the particular context. In some embodiments, each context is associated with its own set of accepted syntax elements, and a command is considered valid or compatible with a particular context only all of its syntax elements are in the set of syntax elements that are accepted by the particular context.

As illustrated in FIG. 10, several modules of the CTT 200 are context-sensitive: the user interface 1095, command interpreter 1010, and the command resolver 1030. These modules behave differently under different contexts and may behave unpredictably when given out-of-context commands or identifiers. The CTT 200 therefore includes two whitelisting filters that check each command based on the current context: A command history whitelisting filter 1050 and a syntax whitelisting filter 1055.

The command history whitelisting filter 1050 is for filtering command history (including actual history in command history cache 1005 and preloaded command history from CLI configuration 1020). This whitelisting filter ensures that only commands that are valid under the context would be made available to the user at the user interface unit 1095. The syntax whitelisting filter 1055 is for checking the syntax of the CLI commands from the user interface 1055. This whitelisting filer ensures that only the commands with acceptable or "safe" syntax and identifiers (of LRs, VMs, VNICs, filters, rules, etc.) can reach the command interpreter 1010 and command resolvers 1030. Out-of-context commands and identifiers, or commands that have incorrect syntax or otherwise failing to meet the requirements of the context will be rejected. This ensures that commands issued to the PE channel manager 1010 (thereby the PEs) are valid commands. This also ensures that only valid commands are stored in the command history cache 1005 for later use.

Figure 11:
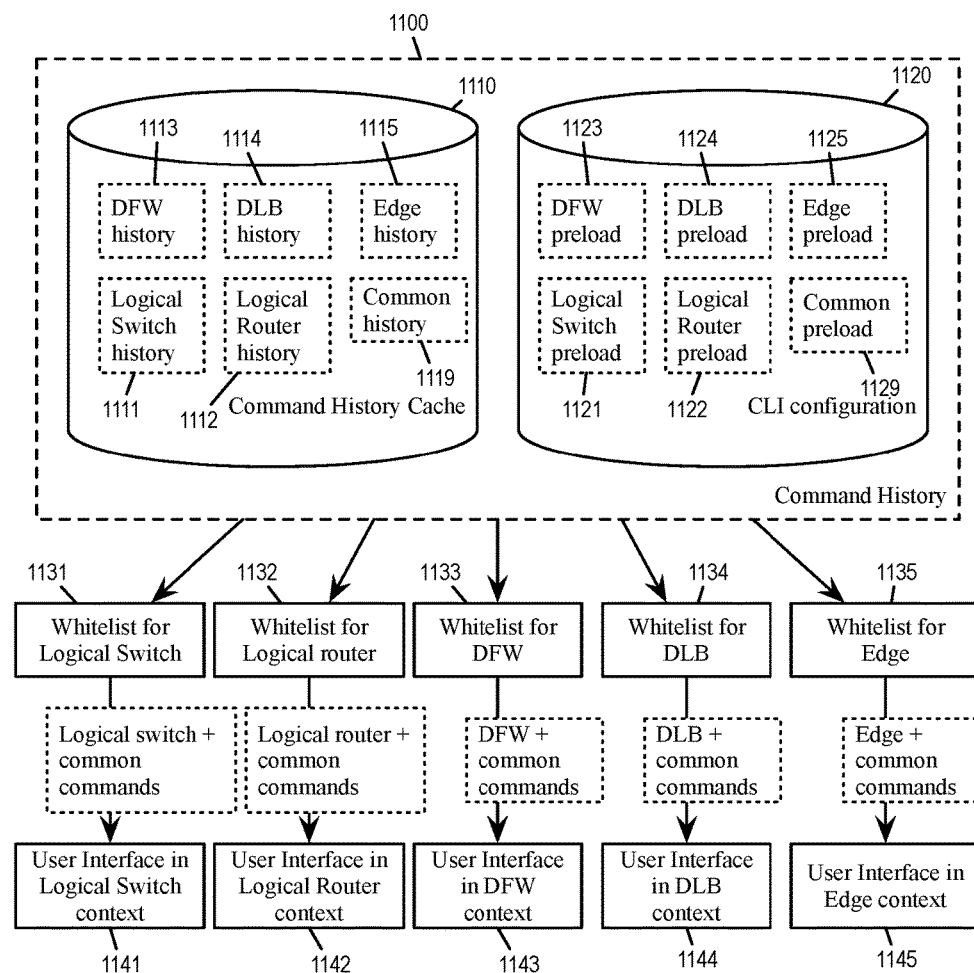
FIG. 11 conceptually illustrates the whitelisting of command history under different contexts.

FIG. 11 conceptually illustrates the whitelisting of command history under different contexts. The figure shows command history 1100, which is a collection of commands from the command history cache 1005 as well as commands that are provided as preload from the CLI configuration 1020. The command history 1100 includes commands from five different contexts: logical switch (command history 1111 and command preload 1121), logical router (command history 1112 and command preload 1122), DFW service (command history 1113 and command preload 1123), DLB service (command history 1114 and command preload 1124), and edge service (command history 1115 and command preload 1125). The command history also includes some commands that are common to all contexts (command history 1119 and preload 1129).

When the CTT is in a particular context, the CTT applies the whitelisting filter for that particular context to obtain a filtered history as sample commands for reuse by the CLI user. For example, when the CTT is in DFW context, the CTT applies a DFW whitelisting filter 1133 to the command history 1100 to obtain a filtered command history 1143 with only DFW commands and common commands; while when the CTT is in DLB context, the CTT applies a DLB whitelisting filter 1134 to the command history 1100 to obtain a filtered command history 1144 with only DLB commands and common commands.

Figure 12:
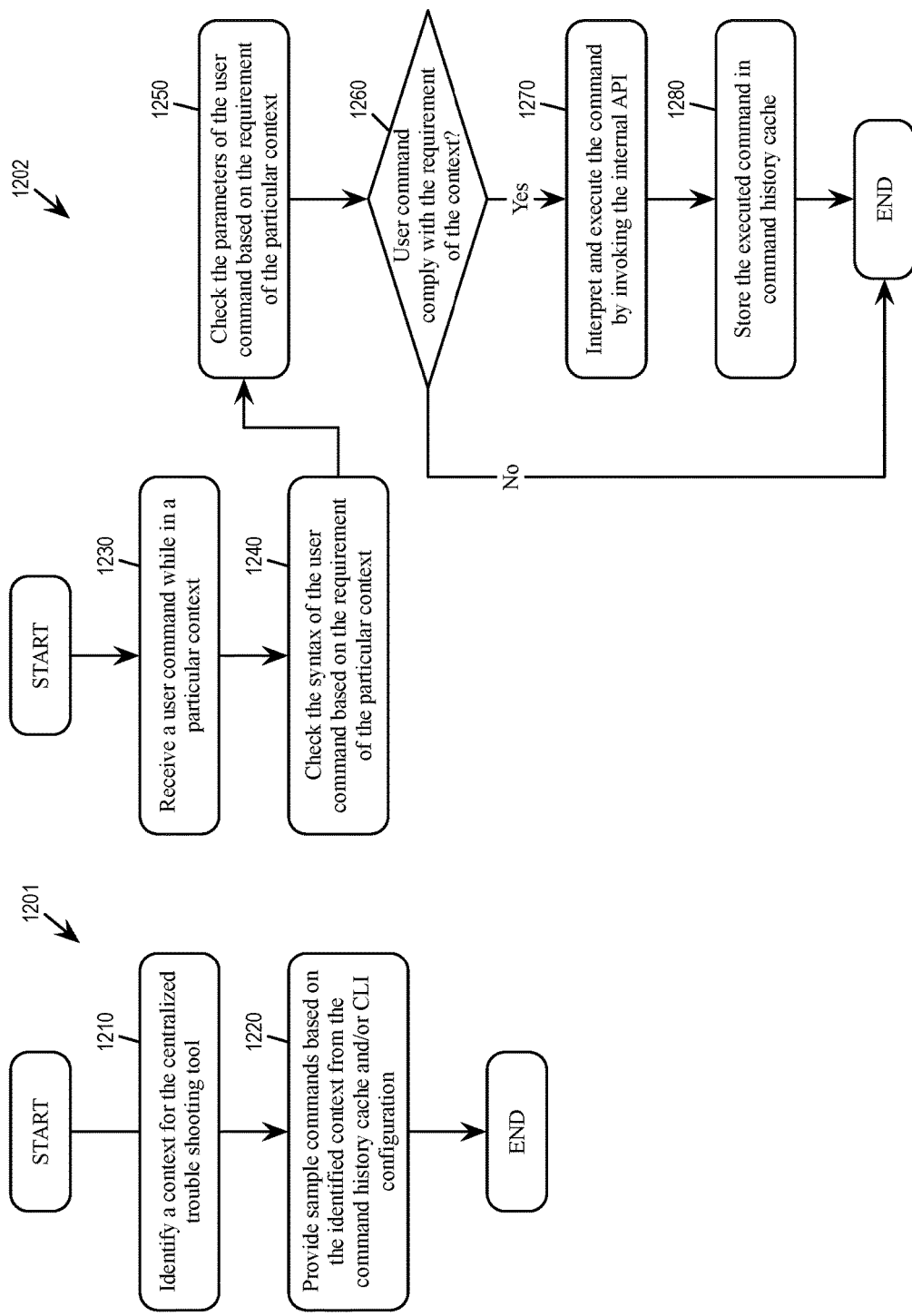
FIG. 12 conceptually illustrates processes for whitelisting CTT commands.

FIG. 12 conceptually illustrates processes for whitelisting CTT commands. The process 1201 is for generating a whitelisted the command history based on CTT context, while the process 1202 is for checking user issued CLI commands based on the context that the CTT is currently under.

In some embodiments, the process 1201 starts when a user starts to use the CTT for troubleshooting tasks by e.g., logging in. In some embodiments, such log-in indicates to the CTT what context is the CTT going to operate under. In some embodiments, the user of CTT can switch context by issuing a command through the CLI while using the CTT without further log-in. The process then identifies (at 1210) the context that the CTT is operating under.

Next, the process provides (at 1220) a set of sample commands based on the identified context by whitelisting the command history cache and/or CLI's configuration to leave only the commands that are valid within the identified context. The process 1201 then ends. The user at this point has a set of sample commands that are valid under the current CTT context to choose from for creating new commands.

The process 1202 starts when it receives (at 1230) a user command through the CLI while the CTT is in a particular context. The process then checks (at 1240) the syntax of the user command to see if it is in a form of a valid command in the particular context. The process then checks (at 1250) the parameters of the user command to see if those parameters have values that valid, e.g., to see if the parameters correspond to identifiers of entities that actually exist within the context.

The process then determines (at 1260) whether the user command is valid under the context, i.e., if the command has correct syntax and its parameters are valid. If the user command is not valid, the process 1202 ends and the user command is discarded without execution. If the user command is valid, the process proceeds to 1270.

At 1270, the process interprets the command by invoking the internal API of the CTT, which in turn communicates with the PEs to query for data or to make changes to the PEs. The process then stores (at 1280) the executed command in the command history cache. It is worth noting that this command has been whitelisted to ensure its validity under the particular context. The process 1202 then ends.

III. Computing Device & Virtualization Software

Figure 13:
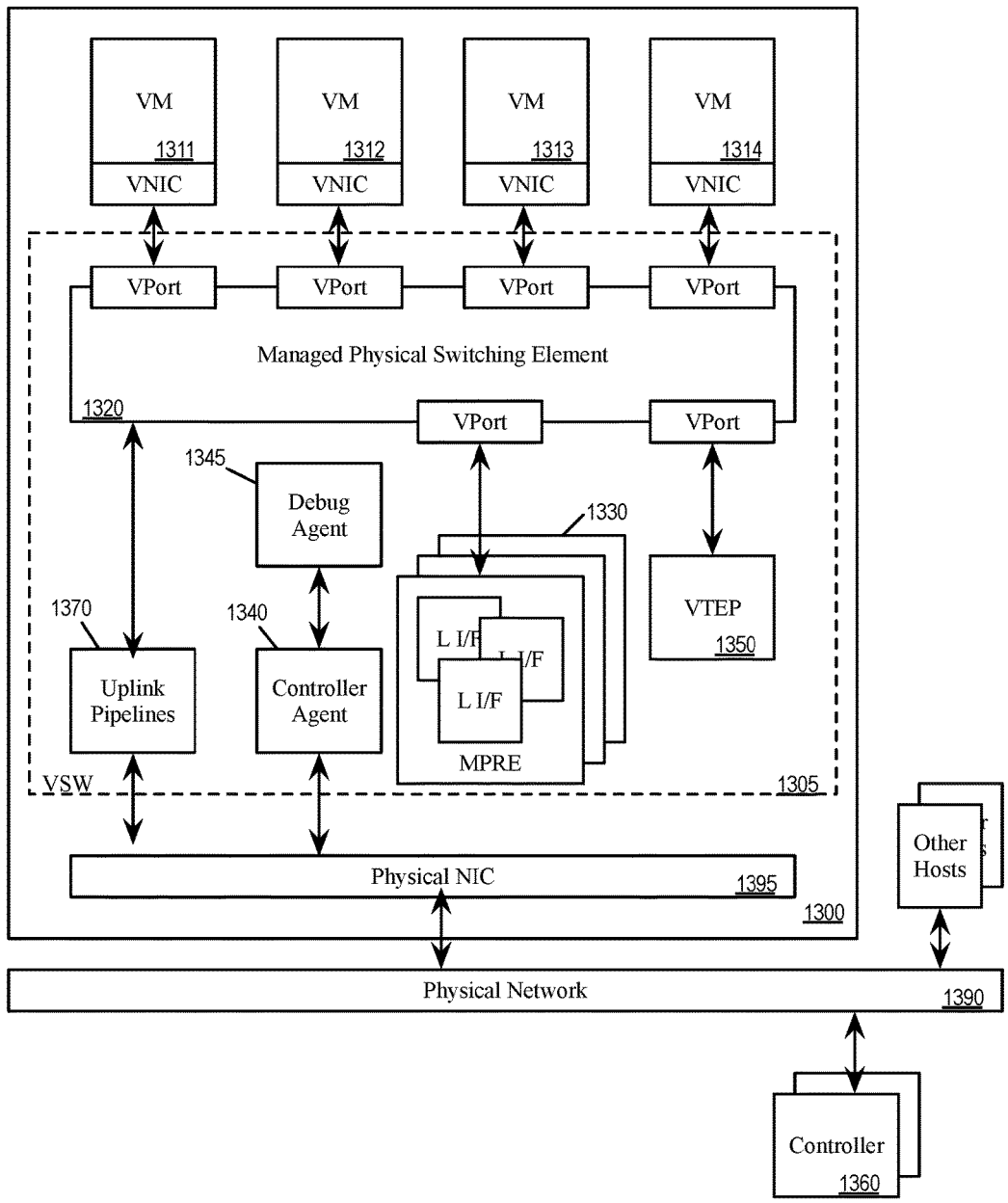
FIG. 13 illustrates a computing device that serves as a host machine.

FIG. 13 illustrates a computing device 1300 that serves as a host machine (or host physical endpoint) for some embodiments of the invention. The computing device 1300 is running virtualization software that implements a physical switching element and a set of physical routing elements. (i.e., MPSE and MPREs).

As illustrated, the computing device 1300 has access to a physical network 1390 through a physical NIC (PNIC) 1395. The host machine 1300 also runs the virtualization software 1305 and hosts VMs 1311-1314. The virtualization software 1305 serves as the interface between the hosted VMs and the physical NIC 1395 (as well as other physical resources, such as processors and memory). Each of the VMs includes a virtual NIC (VNIC) for accessing the network through the virtualization software 1305. Each VNIC in a VM is responsible for exchanging packets between the VM and the virtualization software 1305. In some embodiments, the VNICs are software abstractions of physical NICs implemented by virtual NIC emulators.

The virtualization software 1305 manages the operations of the VMs 1311-1314, and includes several components for managing the access of the VMs to the physical network (by implementing the logical networks to which the VMs connect, in some embodiments). As illustrated, the virtualization software includes several components, including a MPSE 1320, a set of MPREs 1330, a controller agent 1340, a debug agent 1345, a VTEP 1350, and a set of uplink pipelines 1370.

The VTEP (VXLAN tunnel endpoint) 1350 allows the host machine 1300 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1300 sends a data packet (e.g., an Ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1370.

The controller agent 1340 receives control plane messages from a controller or a cluster of controllers. In some embodiments, these control plane message includes configuration data for configuring the various components of the virtualization software (such as the MPSE 1320 and the MPREs 1330) and/or the virtual machines. In the example illustrated in FIG. 13, the controller agent 1340 receives control plane messages from the controller cluster 1360 from the physical network 1390 and in turn provides the received configuration data to the MPREs 1330 through a control channel without going through the MPSE 1320. However, in some embodiments, the controller agent 1340 receives control plane messages from a direct data conduit (not illustrated) independent of the physical network 1390. In some other embodiments, the controller agent receives control plane messages from the MPSE 1320 and forwards configuration data to the router 1330 through the MPSE 1320.

The debug agent 1345 handles message exchange (for the computing device 1300 as a PE) with the central troubleshooting tool (CTT) operated by the network manager. The debug agent 1345 provides status and control of the various components of the virtualization software 1305 to the CTT through these messages with the network manager.

The MPSE 1320 delivers network data to and from the physical NIC 1395, which interfaces the physical network 1390. The MPSE also includes a number of virtual ports (vPorts) that communicatively interconnects the physical NIC with the VMs 1311-1314, the MPREs 1330 and the controller agent 1340. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1390 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1330 perform L3 routing on data packets received from a virtual port on the MPSE 1320. In some embodiments, this routing operation entails resolving L3 IP address to a next-hop L2 MAC address and a next-hop VNI (i.e., the VNI of the next-hop's L2 segment). Each routed data packet is then sent back to the MPSE 1320 to be forwarded to its destination according to the resolved L2 MAC address. This destination can be another VM connected to a virtual port on the MPSE 1320, or a reachable L2 network element on the physical network 1390 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 1330 includes one or more logical interfaces (LIFs) that each serve as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 1370 relays data between the MPSE 1320 and the physical NIC 1395. The uplink module 1370 includes an egress chain and an ingress chain that each performs a number of operations. Some of these operations are pre-processing and/or post-processing operations for the MPRE 1330. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 13, the virtualization software 1305 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1320, and hence a same L2 MAC address (vMAC or pMAC). In some other embodiments, each different MPRE belonging to a different tenant has its own port to the MPSE.

The MPSE 1320 and the MPRE 1330 make it possible for data packets to be forwarded amongst VMs 1311-1314 without being sent through the external physical network 1390 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1300 (and its virtualization software 1305) is able to direct packets of different logical networks to their correct destinations and effectively segregates traffic of different logical networks from each other.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
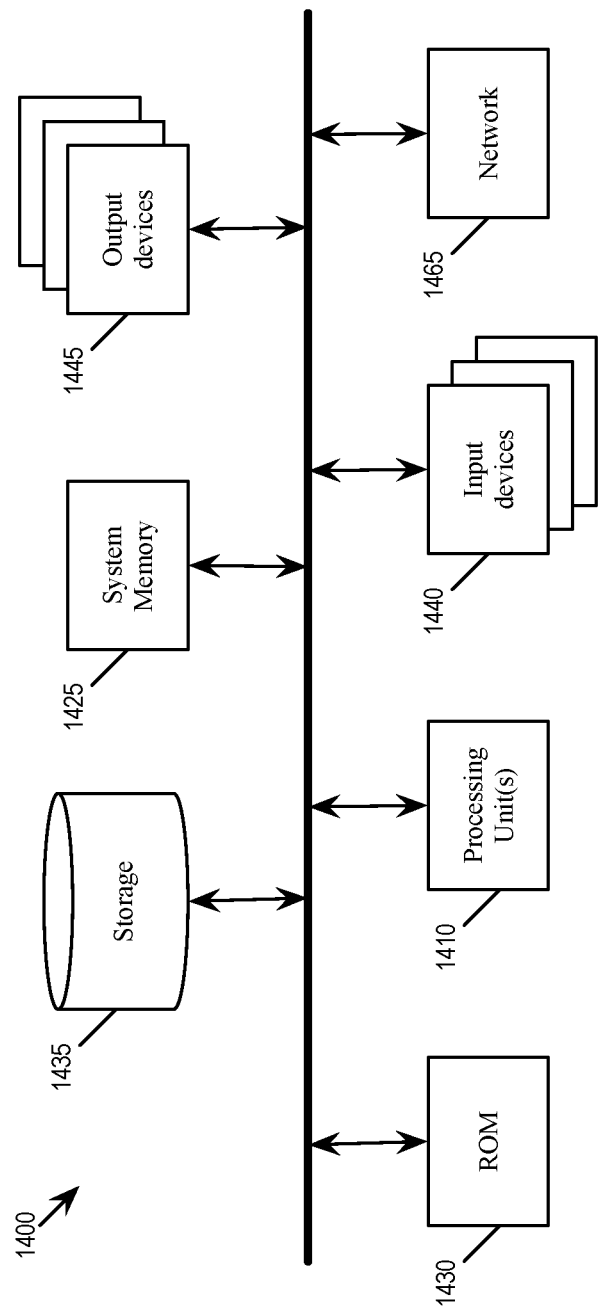
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieves instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieves instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 8 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for troubleshooting a virtual network that is implemented across a plurality of computing devices, the method comprising:
   providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services and each different context recognizes a group of identifiers associated with the context;
   while the CLI is operating in a particular context for a particular type of network service, receiving a command comprising a set of identifiers;
   determining a validity of the received command under the particular context by determining whether the command comprises at least one identifier that is not in the group of identifiers recognized by the particular context; and
   when the received command is valid under the particular context, transmitting data to a computing device identified by the received command.

2. The method of claim 1, wherein the network service is a distributed firewall implemented by multiple computing devices of the virtual network.

3. The method of claim 1, wherein the network service is a distributed load-balancer implemented by multiple computing devices of the virtual network.

4. The method of claim 1, wherein the plurality of contexts comprises a logical switch context, a logical router context, a distributed firewall context, a distributed load balancer context, and an edge context.

5. A method for troubleshooting a virtual network that is implemented across a plurality of computing devices, the method comprising:

providing a command line interface (CLI) for receiving and executing commands for debugging and monitoring the virtual network, each command for communicating with a set of the computing devices in order to monitor a network service being provided by the set of computing devices, wherein (i) the CLI operates in a plurality of different contexts for monitoring a plurality of different types of network services and (ii) each context is associated with its own set of accepted syntax elements;

while the CLI is operating in a particular context for a particular type of network service, receiving a command comprising a set of identifiers;

determining a validity of the received command under the particular context by determining whether the command comprises at least one syntax element that is not in the accepted set of syntax elements of the particular context; and when the received command is valid under the particular context, transmitting data to a computing device identified by the received command.

6. The method of claim 5, wherein the plurality of computing devices comprises host machines that host virtual machines (VMs), each VM interfacing the virtual network through a set of virtual network interface controllers (VNICs), wherein at least some of the network services are implemented at the VNICs of the host machines.

7. The method of claim 5, wherein the network service is one of (i) a distributed firewall implemented by multiple computing devices of the virtual network and (ii) a distributed load-balancer implemented by multiple computing devices of the virtual network.

8. A non-transitory machine readable medium storing a program which when executed by at least one processing unit troubleshoots a virtual network that is implemented across a plurality of computing devices, the program comprising sets of instructions for:

providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services and each different context recognizes a group of identifiers associated with the context;

while the CLI is operating in a particular context for a particular type of network service, receiving a command comprising a set of identifiers;

determining a validity of the received command under the particular context by determining whether the command comprises at least one identifier that is not in the group of identifiers recognized by the particular context; and when the received command is valid under the particular context, transmitting data to a computing device identified by the received command.

9. The non-transitory machine readable medium of claim 8, wherein the network service is a distributed firewall implemented by multiple computing devices of the virtual network.

10. The non-transitory machine readable medium of claim 8, wherein the network service is a distributed load-balancer implemented by multiple computing devices of the virtual network.

11. A non-transitory machine readable medium storing a program which when executed by at least one processing unit troubleshoots a virtual network that is implemented across a plurality of computing devices, the program comprising sets of instructions for:

providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services, the plurality of different contexts comprising a logical switch context, a logical router context, a distributed firewall context, a distributed load balancer context, and an edge context;

while the CLI is operating in a particular context for a particular type of network service, receiving a command comprising a set of identifiers;

determining a validity of the received command under the particular context; and when the received command is valid under the particular context, transmitting data to a computing device identified by the received command.

12. The non-transitory machine readable medium of claim 11, wherein the plurality of computing devices comprises host machines that host virtual machines (VMs), each VM interfacing the virtual network through a set of virtual network interface controllers (VNICs), wherein at least some of the network services are implemented at the VNICs of the host machines.

13. A non-transitory machine readable medium storing a program which when executed by at least one processing unit troubleshoots a virtual network that is implemented across a plurality of computing devices, the program comprising sets of instructions for:

providing a command line interface (CLI) for receiving and executing commands for debugging and monitoring the virtual network, each command for communicating with a set of the computing devices in order to monitor a network service being provided by the set of computing devices, wherein (i) the CLI operates in a plurality of different contexts for monitoring a plurality of different types of network services, and (ii) each context is associated with its own set of accepted syntax elements;

while the CLI is operating in a particular context for a particular type of network service, receiving a command comprising a set of identifiers;

determining a validity of the received command under the particular context by determining whether the command comprises at least one syntax element that is not in the accepted set of syntax elements of the particular context; and when the received command is valid under the particular context, transmitting data to a computing device identified by the received command.

14. The non-transitory machine readable medium of claim 13, wherein the network service is one of (i) a distributed firewall implemented by multiple computing devices of the virtual network and (ii) a distributed load-balancer implemented by multiple computing devices of the virtual network.

15. A method for troubleshooting a virtual network implemented across a plurality of computing devices, the method comprising:

providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services; and retrieving a set of sample commands, comprising a history of previously executed commands at the CLI, for a particular one of the contexts from a storage that stores a plurality of sample commands for the plurality of different contexts, wherein said retrieving comprises identifying and excluding commands that are incompatible with the particular context.

16. The method of claim 15, wherein the set of sample commands further comprises a set of preloaded commands provided by a configuration file of the CLI.

17. A method for troubleshooting a virtual network implemented across a plurality of computing devices, the method comprising:

providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services; and retrieving, from a storage that stores a plurality of sample commands for the plurality of different contexts, a set of sample commands for a particular one of the contexts that is associated with a listing of recognized identifiers, wherein said retrieving comprises (i) identifying an incompatible command by identifying commands having an identifier that is not in the listing of recognized identifiers and (ii) excluding commands that are incompatible with the particular context.

18. The method of claim 17, wherein the plurality of contexts comprises a logical switch context, a logical router context, a distributed firewall context, a distributed load balancer context, and an edge context.

19. A method for troubleshooting a virtual network implemented across a plurality of computing devices, the method comprising:

providing a command line interface (CLI) for receiving and executing commands for debugging and monitoring the virtual network, each command for communicating with a set of the computing devices in order to monitor a network service being provided by the set of computing devices, wherein the CLI operates in a plurality of different contexts for monitoring a plurality of different types of network services; and retrieving, from a storage that stores a plurality of sample commands for the plurality of different contexts, a set of sample commands for a particular one of the contexts that is associated with a set of accepted syntax elements, wherein said retrieving comprises (i) identifying an incompatible command by identifying commands having at least one syntax element that is not in the accepted set of syntax elements and (ii) excluding commands that are incompatible with the particular context.

20. The method of claim 19, wherein the plurality of contexts comprises a logical switch context, a logical router context, a distributed firewall context, a distributed load balancer context, and an edge context.

* * * * *